(12) United States Patent
Ishizeki et al.

(10) Patent No.: US 11,613,165 B2
(45) Date of Patent: Mar. 28, 2023

(54) AIR CONDITIONER FOR VEHICLE

(71) Applicant: SANDEN AUTOMOTIVE CLIMATE SYSTEMS CORPORATION, Isesaki (JP)

(72) Inventors: Tetsuya Ishizeki, Isesaki (JP); Yoshiyuki Okamoto, Isesaki (JP); Akira Horikoshi, Isesaki (JP); Takashi Toyama, Isesaki (JP); Nobuhiko Fujii, Isesaki (JP)

(73) Assignee: SANDEN CORPORATION, Gunma (JP)

( * ) Notice: Subject to any disclaimer, the term of this patent is extended or adjusted under 35 U.S.C. 154(b) by 0 days.

(21) Appl. No.: 17/570,787

(22) Filed: Jan. 7, 2022

(65) Prior Publication Data

US 2022/0134842 A1 May 5, 2022

Related U.S. Application Data

(63) Continuation of application No. 16/604,280, filed as application No. PCT/JP2018/010361 on Mar. 9, 2018, now Pat. No. 11,254,188.

(30) Foreign Application Priority Data

Apr. 26, 2017 (JP) .................. 2017-087669

(51) Int. Cl.
*B60H 1/22* (2006.01)
*B60L 58/24* (2019.01)
(Continued)

(52) U.S. Cl.
CPC ........... *B60H 1/22* (2013.01); *B60H 1/00007* (2013.01); *B60H 1/00278* (2013.01);
(Continued)

(58) Field of Classification Search
CPC .. B60H 1/22; B60H 1/00007; B60H 1/00278; B60H 1/00328; B60H 1/00921;
(Continued)

(56) References Cited

U.S. PATENT DOCUMENTS 6,705,101 B2 3/2004 Bratz
9,797,641 B2 10/2017 Suzuki
(Continued)

FOREIGN PATENT DOCUMENTS

CN 102050007 5/2011
CN 103253149 8/2013
(Continued)

OTHER PUBLICATIONS

Office Action dated Sep. 1, 2022 issued in Chinese Patent Application No. 201880025557.7.

*Primary Examiner* — Ljiljana V. Ciric
(74) *Attorney, Agent, or Firm* — Cozen O'Connor

(57) ABSTRACT

A vehicle air conditioner having a compressor to compress a refrigerant, an air flow passage to supply air to the vehicle; a radiator; an outdoor heat exchanger; a battery temperature adjustment device for letting a heat medium circulate through a battery mounted in the vehicle, thereby adjusting a temperature of the battery; and a control device. The battery temperature adjustment device has a refrigerant-heat medium heat exchanger for performing exchange of heat between the refrigerant and the heat medium. The control device is configured to execute: a radiator and outdoor heat exchanger heating/battery cooling mode, and an obstruct inflow heating/battery cooling mode.

9 Claims, 36 Drawing Sheets

(51) Int. Cl.
  *B60H 1/00* (2006.01)
  *F25B 27/02* (2006.01)
  *B60L 50/60* (2019.01)
  *B60H 1/14* (2006.01)
  *F25B 41/39* (2021.01)
  *H01M 10/6556* (2014.01)
  *B60K 11/04* (2006.01)
  *B60L 1/00* (2006.01)
  *H01M 10/613* (2014.01)
  *H01M 10/615* (2014.01)
  *H01M 10/625* (2014.01)
  *H01M 10/633* (2014.01)
  *H01M 10/635* (2014.01)
  *H01M 10/6569* (2014.01)
  *H01M 10/663* (2014.01)
  *F25B 5/02* (2006.01)
  *F25B 25/00* (2006.01)
  *F25B 6/04* (2006.01)

(52) U.S. Cl.
  CPC ..... *B60H 1/00328* (2013.01); *B60H 1/00921* (2013.01); *B60H 1/143* (2013.01); *B60K 11/04* (2013.01); *B60L 1/00* (2013.01); *B60L 50/60* (2019.02); *B60L 58/24* (2019.02); *F25B 27/02* (2013.01); *F25B 41/39* (2021.01); *H01M 10/613* (2015.04); *H01M 10/615* (2015.04); *H01M 10/625* (2015.04); *H01M 10/633* (2015.04); *H01M 10/635* (2015.04); *H01M 10/6556* (2015.04); *H01M 10/6569* (2015.04); *H01M 10/663* (2015.04); *B60H 2001/00178* (2013.01); *B60H 2001/00307* (2013.01); *B60H 2001/00928* (2013.01); *B60H 2001/00949* (2013.01); *F25B 5/02* (2013.01); *F25B 6/04* (2013.01); *F25B 25/005* (2013.01); *F25B 2400/0403* (2013.01); *F25B 2400/0409* (2013.01); *Y02A 30/274* (2018.01)

(58) Field of Classification Search
  CPC .......... B60H 1/143; B60H 2001/00178; B60H 2001/00307; B60H 2001/00928; B60H 2001/00949; B60L 1/00; B60L 50/60; B60L 58/24; B60K 11/04; F25B 5/02; F25B 6/04; F25B 25/005; F25B 2400/0403; F25B 2400/0409; F25B 27/02; F25B 41/39; H01M 10/613; H01M 10/615; H01M 10/625; H01M 10/633; H01M 10/635; H01M 10/6556; H01M 10/6569; H01M 10/663; Y02A 30/274
  See application file for complete search history.

(56) References Cited

U.S. PATENT DOCUMENTS

| | | |
|---|---|---|
| 9,909,794 B2 | 3/2018 | Suzuki |
| 10,047,988 B2 | 8/2018 | Miyakoshi |
| 10,220,678 B2 | 3/2019 | Miyakoshi |
| 10,239,382 B2 | 3/2019 | Miyakoshi |
| 10,252,600 B2 | 4/2019 | Miyakoshi |
| 10,279,654 B2 | 5/2019 | Miyakoshi |
| 10,315,485 B2 | 6/2019 | Miyakoshi |
| 10,369,864 B2 | 8/2019 | Ishizeki |
| 10,421,338 B2 | 9/2019 | Suzuki |
| 10,427,495 B2 | 10/2019 | Suzuki |
| 10,500,920 B2 | 12/2019 | Ishizeki |
| 10,525,794 B2 | 1/2020 | Suzuki |
| 10,562,375 B2 | 2/2020 | Suzuki |
| 10,625,560 B2 | 4/2020 | Miyakoshi |
| 10,703,169 B2 | 7/2020 | Miyakoshi |
| 10,712,066 B2 | 7/2020 | Miyakoshi |
| 10,766,338 B2 | 9/2020 | Oh |
| 10,814,692 B2 | 10/2020 | Kim |
| 10,974,566 B2 | 4/2021 | Kim |
| 11,021,044 B2 | 6/2021 | Suzuki |
| 11,077,736 B2 | 8/2021 | Ishizeki |
| 11,254,188 B2 * | 2/2022 | Ishizeki ................. F25B 41/39 |
| 2006/0060340 A1 | 3/2006 | Busse et al. |
| 2008/0250804 A1 | 10/2008 | Kubo |
| 2015/0283872 A1 | 10/2015 | Miyakoshi |
| 2015/0298526 A1 | 10/2015 | Miyakoshi |
| 2016/0084554 A1 | 3/2016 | Suzuki |
| 2016/0084555 A1 | 3/2016 | Suzuki |
| 2016/0185185 A1 | 6/2016 | Suzuki |
| 2016/0193896 A1 | 7/2016 | Miyakoshi |
| 2016/0201959 A1 | 7/2016 | Miyakoshi |
| 2016/0221413 A1 | 8/2016 | Gebbie et al. |
| 2017/0080778 A1 | 3/2017 | Suzuki |
| 2017/0106725 A1 | 4/2017 | Kim et al. |
| 2017/0182860 A1 | 6/2017 | Miyakoshi |
| 2017/0217288 A1 | 8/2017 | Suzuki |
| 2017/0225542 A1 | 8/2017 | Suzuki |
| 2017/0274725 A1 | 9/2017 | Miyakoshi |
| 2017/0282689 A1 | 10/2017 | Miyakoshi |
| 2017/0326943 A1 | 11/2017 | Ishizeki |
| 2018/0001784 A1 | 1/2018 | Porras |
| 2018/0006347 A1 | 1/2018 | Porras |
| 2018/0141409 A1 | 5/2018 | Miyakoshi |
| 2018/0354342 A1 | 12/2018 | Miyakoshi |
| 2019/0168570 A1 | 6/2019 | Lee |
| 2019/0210429 A1 | 7/2019 | Suzuki |
| 2019/0322159 A1 | 10/2019 | Kim |
| 2019/0381857 A1 | 12/2019 | Lee |
| 2020/0122544 A1 | 4/2020 | Ishizeki |
| 2020/0171919 A1 | 6/2020 | Ishizeki |
| 2020/0346520 A1 | 11/2020 | Ishizeki |
| 2021/0101450 A1 | 4/2021 | Kobayashi |
| 2021/0300146 A1 | 9/2021 | Ishizeki |

FOREIGN PATENT DOCUMENTS

| | | |
|---|---|---|
| CN | 105163964 | 12/2015 |
| CN | 106058362 | 10/2016 |
| JP | 2012-188108 | 10/2012 |
| JP | 2013-154805 | 8/2013 |
| JP | 2014-213765 | 11/2014 |
| JP | 2015-205564 | 11/2015 |
| JP | 2016-090201 | 5/2016 |
| WO | WO 2014/097831 | 6/2014 |

* cited by examiner

AIR CONDITIONER FOR VEHICLE

RELATED APPLICATIONS

This application is a continuation of U.S. patent application Ser. No. 16/604,280 filed Oct. 10, 2019, which is a U.S. National Stage of International Application No. PCT/JP2018/010361 filed Mar. 9, 2018, which claims priority of Japanese application no. 2017-087669 filed Apr. 26, 2017, the entire content of all of which are hereby incorporated by reference.

FIELD OF THE INVENTION

The present invention relates to an air conditioner of a heat pump system which conditions air of a vehicle interior of a vehicle, and more particularly, it relates to an air conditioner for a vehicle which is suitable for a hybrid car and an electric vehicle each having a battery.

BACKGROUND OF THE INVENTION

Due to actualization of environmental problems in recent years, hybrid cars and electric vehicles each of which drives a motor for running by power supplied from a battery have spread. Further, as an air conditioning device which is applicable to such a vehicle, there has been developed an air conditioning device which includes a refrigerant circuit to which a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let outdoor air flow and let the refrigerant absorb or radiate heat are connected, and which changes and executes a heating mode (a heating operation) to let the refrigerant discharged from the compressor radiate heat in the radiator and let the refrigerant from which the heat has been radiated in the radiator absorb heat in the outdoor heat exchanger, and a cooling mode (a cooling operation) to let the refrigerant discharged from the compressor radiate heat in the outdoor heat exchanger and let the refrigerant absorb heat in the heat absorber (refer to, for example, Japanese Patent Application Publication No. 2014-213765).

On the other hand, the battery mounted in the vehicle becomes high in temperature during its charging, or due to self-heat generation during its discharging. There is a risk that when the charging/discharging of the battery is performed in such a state, its deterioration progresses and soon the battery causes an operation failure to lead to breakage. Thus, there has also been developed a battery capable of adjusting the temperature of a secondary battery (battery) by circulating through the battery, air (heat medium) cooled by a refrigerant circulated in a refrigerant circuit (refer to, for example, Japanese Patent Application Publication No. 2016-90201).

SUMMARY OF THE INVENTION

However, the conventional constitution shown in Japanese Patent Application Publication No. 2016-90201 described above has shown a mode of heating the battery (second battery) while heating a vehicle interior, but does not show a mode of cooling the battery while heating the vehicle interior. On the other hand, since the battery generates heat due to the charging/discharging even under an environment in which it is desired to heat the vehicle interior (e.g., a low outdoor air temperature environment), it is possible to suppress frosting of an outdoor heat exchanger and extend a heating operation time if the heat of the battery can be utilized for the heating of the vehicle interior. Further, since the amount of heat generation of the battery becomes large in the case of such as when the battery is rapidly charged, there is a need to cool the battery even by radiation of the heat of the battery into the outdoor air with the outdoor heat exchanger.

The present invention has been developed to solve such conventional technical problems, and an object thereof is to provide an air conditioner for a vehicle which is capable of appropriately cooling a battery while effectively utilizing the heat of the battery for heating of a vehicle interior.

Means for Solving the Problems

An air conditioner for a vehicle of the present invention conditions air of a vehicle interior, including a compressor to compress a refrigerant, an air flow passage through which the air to be supplied to the vehicle interior flows, a radiator to let the refrigerant radiate heat, thereby heating the air to be supplied from the air flow passage to the vehicle interior, an outdoor heat exchanger disposed outside the vehicle interior to let the refrigerant absorb or radiate heat, a battery temperature adjustment device to let a heat medium circulate through a battery mounted in the vehicle, thereby adjusting a temperature of the battery, and a control device. The air conditioner for the vehicle is characterized in that the battery temperature adjustment device has a refrigerant-heat medium heat exchanger to perform exchange of heat between the refrigerant and the heat medium, and the control device executes a first heating/battery cooling mode to let the refrigerant discharged from the compressor radiate heat in the radiator, decompress the refrigerant from which the heat has been radiated, and then let the refrigerant absorb heat in the outdoor heat exchanger and the refrigerant-heat medium heat exchanger, and a second heating/battery cooling mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger.

The air conditioner for the vehicle of the invention of one embodiment is characterized in that in the above invention, the control device executes a third heating/battery cooling mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger.

The air conditioner for the vehicle of the invention of another embodiment is characterized in that in the above invention, the control device changes and executes the respective heating/battery cooling modes on the basis of a required heating capability required for the radiator and a required battery cooling capability required for the battery temperature adjustment device.

The air conditioner for the vehicle of the invention of yet another embodiment is characterized in that in the above invention, the control device executes the first heating/battery cooling mode when the required heating capability is larger than the required battery cooling capability, executes the third heating/battery cooling mode when the required heating capability and the required battery cooling capability are equal to each other or values close to each other, and executes the second heating/battery cooling mode when the required battery cooling capability is larger than the required heating capability.

The air conditioner for the vehicle of the invention of still another embodiment is characterized in that in the above invention, the battery temperature adjustment device includes a heating device to heat the heat medium, and in the first heating/battery cooling mode, the control device heats the heat medium by the heating device when it is not possible to achieve the required heating capability by a heating capability generable by the radiator.

The air conditioner for the vehicle of the invention of still another embodiment is characterized in that in the second heating/battery cooling mode, the control device controls an operation of the compressor to thereby adjust the cooling capability of the battery by the battery temperature adjustment device, and controls circulation of the refrigerant in the radiator and/or the outdoor heat exchanger or passing of the refrigerant through the radiator and/or the outdoor heat exchanger to thereby adjust a heating capability of the vehicle interior by the radiator.

The air conditioner for the vehicle of the invention of yet a further embodiment is characterized in that in the above invention, a means to control the circulation of the refrigerant in the radiator by the control device is an outdoor expansion valve to decompress the refrigerant flowing into the outdoor heat exchanger, a means to control the circulation of the refrigerant in the outdoor heat exchanger by the control device is an auxiliary expansion valve to decompress the refrigerant flowing into the refrigerant-heat medium heat exchanger, a means to control the passing of the refrigerant through the radiator by the control device is an air mix damper to adjust a ratio at which the air in the air flow passage is to be passed through the radiator, and a means to control the passing of the refrigerant through the outdoor heat exchanger by the control device is an outdoor blower to pass outdoor air through the outdoor heat exchanger and/or a shutter to obstruct inflow of running air into the outdoor heat exchanger.

The air conditioner for the vehicle of the invention of yet a further embodiment is characterized by including an outdoor expansion valve to decompress the refrigerant flowing out from the radiator and flowing into the outdoor heat exchanger, a heat absorber to let the refrigerant flowing out from the outdoor heat exchanger absorb heat, thereby cooling the air to be supplied from the air flow passage to the vehicle interior, a valve device to control inflow of the refrigerant into the heat absorber, a first bypass circuit to let the refrigerant flowing out from the outdoor heat exchanger suck into the compressor without flowing into the valve device, a first opening/closing valve disposed in this first bypass circuit, a second bypass circuit to distribute the refrigerant flowing out from the radiator from a refrigerant upstream side of the outdoor expansion valve to let the refrigerant flow to a refrigerant upstream side of the valve device, a second opening/closing valve disposed in the second bypass circuit, a branch circuit to let the refrigerant flowing out from the second bypass circuit flow into the refrigerant-heat medium heat exchanger, an auxiliary expansion valve disposed in the branch circuit to decompress the refrigerant flowing into the refrigerant-heat medium heat exchanger, and a check valve to obstruct inflow of the refrigerant flowing out from the second bypass circuit into the outdoor heat exchanger, and in that the control device controls the outdoor expansion valve, the valve device, the first opening/closing valve, the second opening/closing valve, the auxiliary expansion valve, and the battery temperature adjustment device to thereby change and execute the first heating/battery cooling mode, the second heating/battery cooling mode, and the third heating/battery cooling mode.

The air conditioner for the vehicle of the invention of still another embodiment is characterized in that in the above respective inventions, in a state in which the outdoor air is not passed through the outdoor heat exchanger or a state in which the inflow of the running air into the outdoor heat exchanger is obstructed, the control device executes a defrosting/heating/battery cooling mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger.

In accordance with another embodiment, an air conditioner for a vehicle is described having a compressor to compress a refrigerant; an air flow passage through which the air to be supplied to the vehicle interior can flow; a radiator for letting the refrigerant radiate heat, thereby heating the air to be supplied from the air flow passage to the vehicle interior; an outdoor heat exchanger disposed outside the vehicle interior for letting the refrigerant absorb or radiate heat; a battery temperature adjustment device for letting a heat medium circulate through a battery mounted in the vehicle, thereby adjusting a temperature of the battery; and a control device. The battery temperature adjustment device has a refrigerant-heat medium heat exchanger for performing exchange of heat between the refrigerant and the heat medium, and wherein the control device is configured to execute: a radiator and outdoor heat exchanger heating/battery cooling mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger, and an obstruct inflow heating/battery cooling mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger.

Advantageous Effect of the Invention

According to the present invention, in an air conditioner for a vehicle to condition air of a vehicle interior, including a compressor to compress a refrigerant, an air flow passage through which the air to be supplied to the vehicle interior flows, a radiator to let the refrigerant radiate heat, thereby heating the air to be supplied from the air flow passage to the vehicle interior, an outdoor heat exchanger disposed outside the vehicle interior to let the refrigerant absorb or radiate heat, a battery temperature adjustment device to let a heat medium circulate through a battery mounted in the vehicle, thereby adjusting a temperature of the battery, and a control device, the battery temperature adjustment device has a refrigerant-heat medium heat exchanger to perform exchange of heat between the refrigerant and the heat medium, and the control device executes a first heating/battery cooling mode to let the refrigerant discharged from the compressor radiate heat in the radiator, decompress the refrigerant from which the heat has been radiated, and then let the refrigerant absorb heat in the outdoor heat exchanger and the refrigerant-heat medium heat exchanger, and a second heating/battery cooling mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger. Therefore, when the amount of heat generation of the battery is small, the control device executes the first heating/battery cooling mode to absorb heat from the outdoor air in the outdoor heat exchanger, and further make it possible to heat the vehicle interior while pumping up the heat of the battery to cool the battery. Further, when the amount of heat generation of the battery is large at the rapid charging or the like, the control device executes the second heating/battery cooling mode to radiate the heat of the battery into the outdoor air in the outdoor heat exchanger and to make it possible to heat the vehicle interior while cooling the battery.

Thus, in the present invention, since it is possible to change the heat absorption and radiation of the refrigerant in the outdoor heat exchanger when heating the vehicle interior, the heat of the battery is effectively utilized to efficiently heat the vehicle interior, thereby making it possible to appropriately cool the battery while suppressing frosting to the outdoor heat exchanger.

Further, as in the invention of claim 2, if the control device is configured to execute a third heating/battery cooling mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger. Consequently, when the amount of heat required to heat the vehicle interior and the amount of heat generation of the battery become almost equal to each other, the control device executes the third heating/battery cooling mode, thereby making it possible to heat the vehicle interior only by the heat pumped up from the battery. Thus, it is possible to efficiently heat the vehicle interior and appropriately cool the battery while eliminating the problem of frosting to the outdoor heat exchanger.

In this case, as in the invention of claim 3, the control device changes and executes the aforementioned respective heating/battery cooling modes on the basis of a required heating capability required for the radiator and a required battery cooling capability required for the battery temperature adjustment device, thereby enabling the heating of the vehicle interior and the cooling of the battery to be appropriately compatible.

For example, as in the invention of claim 4, the control device executes the first heating/battery cooling mode when the required heating capability is larger than the required battery cooling capability, executes the third heating/battery cooling mode when the required heating capability and the required battery cooling capability are equal to each other or values close to each other, and executes the second heating/battery cooling mode when the required battery cooling capability is larger than the required heating capability. Thus, the respective heating/battery cooling modes are appropriately changed, thereby making it possible to smoothly perform the efficient heating of the vehicle interior and the effective cooling of the battery.

Further, as in the invention of claim 5, the battery temperature adjustment device is provided with a heating device to heat the heat medium. In the first heating/battery cooling mode, if the control device heats the heat medium by the heating device when it is not possible to achieve the required heating capability by a heating capability generable by the radiator, the amount of heat generation of the battery is small. When the heating capability of the vehicle interior by the radiator runs short in the first heating/battery cooling mode, the controller heats the heat medium by the heating device of the battery temperature adjustment device and pumps up the heat from the refrigerant, thereby enabling its shortage to be complemented.

Furthermore, as in the invention of claim 6, in the second heating/battery cooling mode, the control device controls an operation of the compressor to thereby adjust the cooling capability of the battery by the battery temperature adjustment device, and controls circulation of the refrigerant in the radiator and/or the outdoor heat exchanger or passing of the refrigerant through the radiator and/or the outdoor heat exchanger to thereby adjust a heating capability of the vehicle interior by the radiator. Consequently, when the amount of heat generation of the battery is large, the cooling capability of the battery is adjusted by the control of the compressor in the second heating/battery cooling mode to effectively cool the battery. The heating by the radiator can be appropriately adjusted by controlling the circulation or passing of the refrigerant in and through the radiator and/or the outdoor heat exchanger.

In this case, as in the invention of claim 7, a means to control the circulation of the refrigerant in the radiator by the control device is capable of adopting an outdoor expansion valve to decompress the refrigerant flowing into the outdoor heat exchanger, a means to control the circulation of the refrigerant in the outdoor heat exchanger by the control device is capable of adopting an auxiliary expansion valve to decompress the refrigerant flowing into the refrigerant-heat medium heat exchanger, a means to control the passing of the refrigerant through the radiator by the control device is capable of adopting an air mix damper to adjust a ratio at which the air in the air flow passage is to be passed through the radiator, and a means to control the passing of the refrigerant through the outdoor heat exchanger by the control device is capable of adopting and outdoor blower to pass outdoor air through the outdoor heat exchanger and/or a shutter to obstruct inflow of running air into the outdoor heat exchanger.

Then, as in the invention of claim 8, there are provided an outdoor expansion valve to decompress the refrigerant flowing out from the radiator and flowing into the outdoor heat exchanger, a heat absorber to let the refrigerant flowing out from the outdoor heat exchanger absorb heat, thereby cooling the air to be supplied from the air flow passage to the vehicle interior, a valve device to control inflow of the refrigerant into the heat absorber, a first bypass circuit to let the refrigerant flowing out from the outdoor heat exchanger suck into the compressor without flowing into the valve device, a first opening/closing valve disposed in this first bypass circuit, a second bypass circuit to distribute the refrigerant flowing out from the radiator from a refrigerant upstream side of the outdoor expansion valve to let the refrigerant flow to a refrigerant upstream side of the valve device, a second opening/closing valve disposed in this second bypass circuit, a branch circuit to let the refrigerant flowing out from the second bypass circuit flow into the refrigerant-heat medium heat exchanger, an auxiliary expansion valve disposed in the branch circuit to decompress the refrigerant flowing into the refrigerant-heat medium heat exchanger, and a check valve to obstruct inflow of the refrigerant flowing out from the second bypass circuit into the outdoor heat exchanger. Further, the control device controls the outdoor expansion valve, the valve device, the first opening/closing valve, the second opening/closing valve, the auxiliary expansion valve, and the battery temperature adjustment device and changes and executes the first heating/battery cooling mode, the second heating/battery cooling mode, and the third heating/battery cooling mode. Consequently, the first heating/battery cooling mode can be executed by opening the first opening/closing valve and the second opening/closing valve and closing the valve device to decompress the refrigerant flowing into the outdoor heat exchanger and the refrigerant-heat medium heat exchanger by the outdoor expansion valve and the auxiliary expansion valve. The third heating/battery cooling mode can be executed by opening the second opening/closing valve, fully closing the outdoor expansion valve, and closing the first opening/closing valve and the valve device to decompress the refrigerant flowing into the refrigerant-heat medium heat exchanger by the auxiliary expansion valve. The second heating/battery cooling mode can be executed by opening the outdoor expansion valve and closing the first opening/closing valve, the second opening/closing valve, and the valve device to decompress the refrigerant flowing into the refrigerant-heat medium heat exchanger by the auxiliary expansion valve.

Further, as in the invention of claim 9, in a state in which the outdoor air is not passed through the outdoor heat exchanger or a state in which the inflow of the running air into the outdoor heat exchanger is obstructed, the control device executes a defrosting/heating/battery cooling mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger. Consequently, it is possible to pump up the heat of the battery and thereby heat the vehicle interior while defrosting the outdoor heat exchanger by the high-temperature refrigerant discharged from the compressor.

DETAILED DESCRIPTION OF THE DRAWINGS

Hereinafter, description will be made as to embodiments of the present invention in detail with reference to the drawings.

Figure 1:
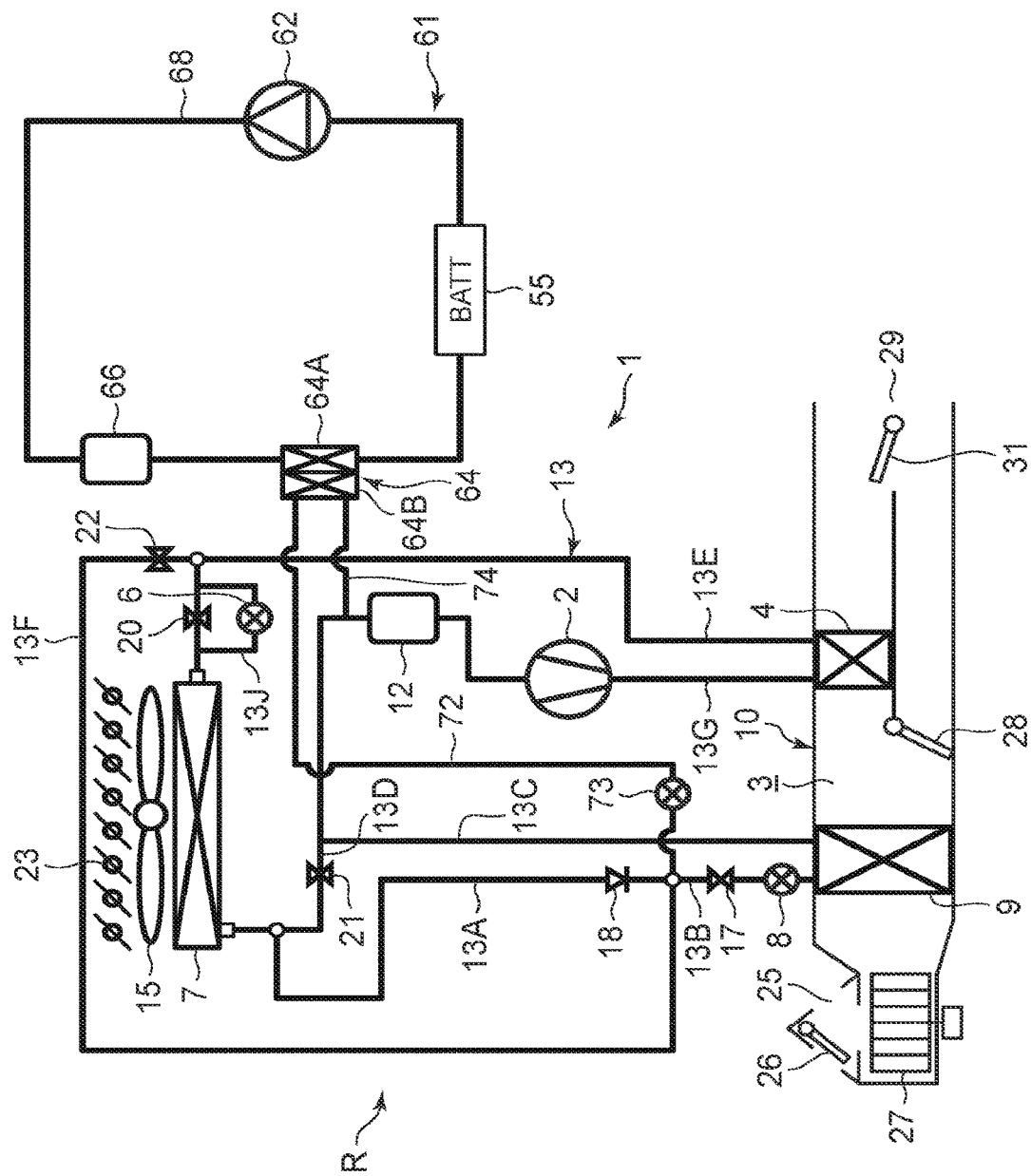
FIG. 1 is a constitutional view of an air conditioner for a vehicle of an embodiment to which the present invention is applied.

FIG. 1 illustrates a constitutional view of an air conditioner 1 for a vehicle of an embodiment of the present invention. A vehicle of the embodiment to which the present invention is applied is an electric vehicle (EV) in which an engine (an internal combustion engine) is not mounted, and is mounted with a battery 55 and runs with an electric motor for running (not shown in the drawing) which is driven by being supplied with power charged in the battery 55. The air conditioner 1 for the vehicle of the present invention is also driven by the power of the battery 55.

That is, in the electric vehicle which is not capable of performing heating by engine waste heat, the air conditioner 1 for the vehicle of the embodiment performs a heating operation by a heat pump operation in which a refrigerant circuit R is used. Further, the air conditioner 1 for the vehicle selectively executes respective air conditioning operations of a dehumidifying and heating operation, an internal cycle operation, a dehumidifying and cooling operation, and a cooling operation to perform air conditioning of a vehicle interior.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The air conditioner 1 for the vehicle of the embodiment performs air conditioning (heating, cooling, dehumidifying, and ventilation) of the vehicle interior of the electric vehicle. An electric type of compressor 2 to compress a refrigerant, a radiator 4 which is provided in an air flow passage 3 of an HVAC unit 10 in which air in the vehicle interior is ventilated and circulated, to let the high-temperature high-pressure refrigerant discharged from the compressor 2 flow therein via a refrigerant pipe 13G and to let the refrigerant radiate heat to the vehicle interior, an outdoor expansion valve 6 constituted of an electric valve which decompresses and expands the refrigerant during the heating, an outdoor heat exchanger 7 which performs heat exchange between the refrigerant and outdoor air to function as a radiator to let the refrigerant radiate heat during the cooling and to function as an evaporator to let the refrigerant absorb heat during the heating, an indoor expansion valve 8 constituted of an electric valve (which may be a mechanical expansion valve) to decompress and expand the refrigerant, a heat absorber 9 provided in the air flow passage 3 to let the refrigerant absorb heat during the cooling and dehumidifying from interior and exterior of the vehicle, an accumulator 12, and others are successively connected by a refrigerant pipe 13, whereby a refrigerant circuit R is constituted. The outdoor expansion valve 6 decompresses and expands the refrigerant flowing out from the radiator 4 and flowing in the outdoor heat exchanger 7 and can also be fully closed.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h). Further, 23 in the drawing is a shutter referred to as a grille shutter. When the shutter 23 is closed, it is constituted to prevent running air from flowing into the outdoor heat exchanger 7.

Further, a refrigerant pipe 13A connected to a refrigerant outlet side of the outdoor heat exchanger 7 is connected to a refrigerant pipe 13B via a check valve 18. Incidentally, the check valve 18 has a refrigerant pipe 13B side which serves as a forward direction. The refrigerant pipe 13B is connected to the indoor expansion valve 8 via a solenoid valve 17 as an opening/closing valve to be opened during the cooling. In the embodiment, these solenoid valve 17 and indoor expansion valve 8 constitute a valve device to control the inflow of the refrigerant into the heat absorber 9.

In addition, the refrigerant pipe 13A extending out from the outdoor heat exchanger 7 branches, and this branching refrigerant pipe 13D as a first bypass circuit communicates and connects with a refrigerant pipe 13C located on an outlet side of the heat absorber 9 via a solenoid valve 21 as a first opening/closing valve to be opened during the heating. Then, the refrigerant pipe 13C is connected to the accumulator 12, and the accumulator 12 is connected to a refrigerant suction side of the compressor 2.

Furthermore, a refrigerant pipe 13E on an outlet side of the radiator 4 branches to a refrigerant pipe 13J and a refrigerant pipe 13F before the outdoor expansion valve 6 (on a refrigerant upstream side). One branching refrigerant pipe 13J is connected to a refrigerant inlet side of the outdoor heat exchanger 7 via the outdoor expansion valve 6. Additionally, the other branching refrigerant pipe 13F communicates and connects with a connecting part of the refrigerant pipe 13A and the refrigerant pipe 13B located on a refrigerant downstream side of the check valve 18 and a refrigerant upstream side of the solenoid valve 17 via a solenoid valve 22 as a second opening/closing valve to be opened during the dehumidifying.

Consequently, the refrigerant pipe 13F is connected in parallel with a series circuit of the outdoor expansion valve 6, the outdoor heat exchanger 7, and the check valve 18. The refrigerant pipe 13F serves as a second bypass circuit which bypasses the outdoor expansion valve 6, the outdoor heat exchanger 7, and the check valve 18. Further, a solenoid valve 20 as an opening/closing valve for bypass is connected in parallel with the outdoor expansion valve 6.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (indoor air circulation) and outdoor air which is air outside the vehicle interior (outdoor air introduction). Furthermore, an indoor blower (a blower fan) 27 to supply the introduced indoor or outdoor air to the air flow passage 3 is disposed on an air downstream side of the suction changing damper 26.

Additionally, in the air flow passage 3 on an air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4. Furthermore, in the air flow passage 3 on an air downstream side of the radiator 4, there is formed each outlet (represented by an outlet 29 in FIG. 1) of FOOT (foot), VENT (vent) or DEF (defroster), and in the outlet 29, an outlet changing damper 31 is disposed to execute changing control of blowing of the air from each outlet mentioned above.

Furthermore, the air conditioner 1 for the vehicle of the present invention is provided with a battery temperature adjustment device 61 for circulating a heat medium through the battery 55 to adjust the temperature of the battery 55. The battery temperature adjustment device 61 of the embodiment is provided with a circulating pump 62 as a circulation device to circulate the heat medium through the battery 55, a heat medium heating heater 66 as a heating device, and a refrigerant-heat medium heat exchanger 64. Those and the battery 55 are annularly connected by a heat medium pipe 68.

In the case of the present embodiment, the heat medium heating heater 66 is connected to a discharge side of the circulating pump 62. An inlet of a heat medium flow passage 64A of the refrigerant-heat medium heat exchanger 64 is connected to an outlet of the heat medium heating heater 66. An inlet of the battery 55 is connected to an outlet of the heat medium flow passage 64A, and an outlet of the battery 55 is connected to a suction side of the circulating pump 62.

As the heat medium used in the battery temperature adjustment device 61, for example, water, a refrigerant such as HFO-1234f, liquid such as a coolant or the like, or gas such as air or the like can be employed. Incidentally, in the embodiment, water is employed as the heat medium. Also, the heat medium heating heater 66 is constituted of an electric heater such as a PTC heater or the like. Further, for example, a jacket structure capable of circulating the heat medium in a heat exchange relation with the battery 55 is provided around the battery 55.

Then, when the circulating pump 62 is operated, the heat medium discharged from the circulating pump 62 reaches the heat medium heating heater 66. When the heat medium heating heater 66 generates heat, the heat medium is heated thereat and then next flows into the heat medium flow passage 64A of the refrigerant-heat medium heat exchanger 64. The heat medium flowing out from the heat medium flow passage 64A of the refrigerant-heat medium heat exchanger 64 reaches the battery 55. The heat medium performs heat exchange with the battery 55 thereat and is then sucked into the circulating pump 62 to be circulated in the heat medium pipe 68.

On the other hand, one end of a branch pipe 72 as a branch circuit disposed on a refrigerant downstream side (forward side) of the check valve 18 and a refrigerant upstream side of the solenoid valve 17 is connected to an outlet of the refrigerant pipe 13F of the refrigerant circuit R, i.e., a connecting part of the refrigerant pipe 13F, the refrigerant pipe 13A, and the refrigerant pipe 13B. An auxiliary expansion valve 73 constituted of an electric valve is provided in the branch pipe 72. The auxiliary expansion valve 73 is capable of decompressing and expanding the refrigerant flowing into a refrigerant flow passage 64B to be described later, of the refrigerant-heat medium heat exchanger 64 and also performing full closing. Then, the other end of the branch pipe 72 is connected to the refrigerant flow passage 64B of the refrigerant-heat medium heat exchanger 64. One end of a refrigerant pipe 74 is connected to an outlet of the refrigerant flow passage 64B, and the other end of the refrigerant pipe 74 is connected to the refrigerant pipe 13C before the accumulator 12 (refrigerant upstream side). It is to be noted that these auxiliary expansion valve 73 and others also constitute a part of the refrigerant circuit R, and at the same time constitutes even a part of the battery temperature adjustment device 61.

When the auxiliary expansion valve 73 is opened, the refrigerant (some refrigerant or all refrigerant) flowing out from the refrigerant pipe 13F and the outdoor heat exchanger 7 is decompressed in the auxiliary expansion valve 73 and then flows into the refrigerant flow passage 64B of the refrigerant-heat medium heat exchanger 64 to evaporate there. The refrigerant absorbs heat from the heat medium flowing through the heat medium flow passage 64A in the process of flowing through the refrigerant flow passage 64B, followed by being sucked into the compressor 2 through the accumulator 12.

Figure 2:
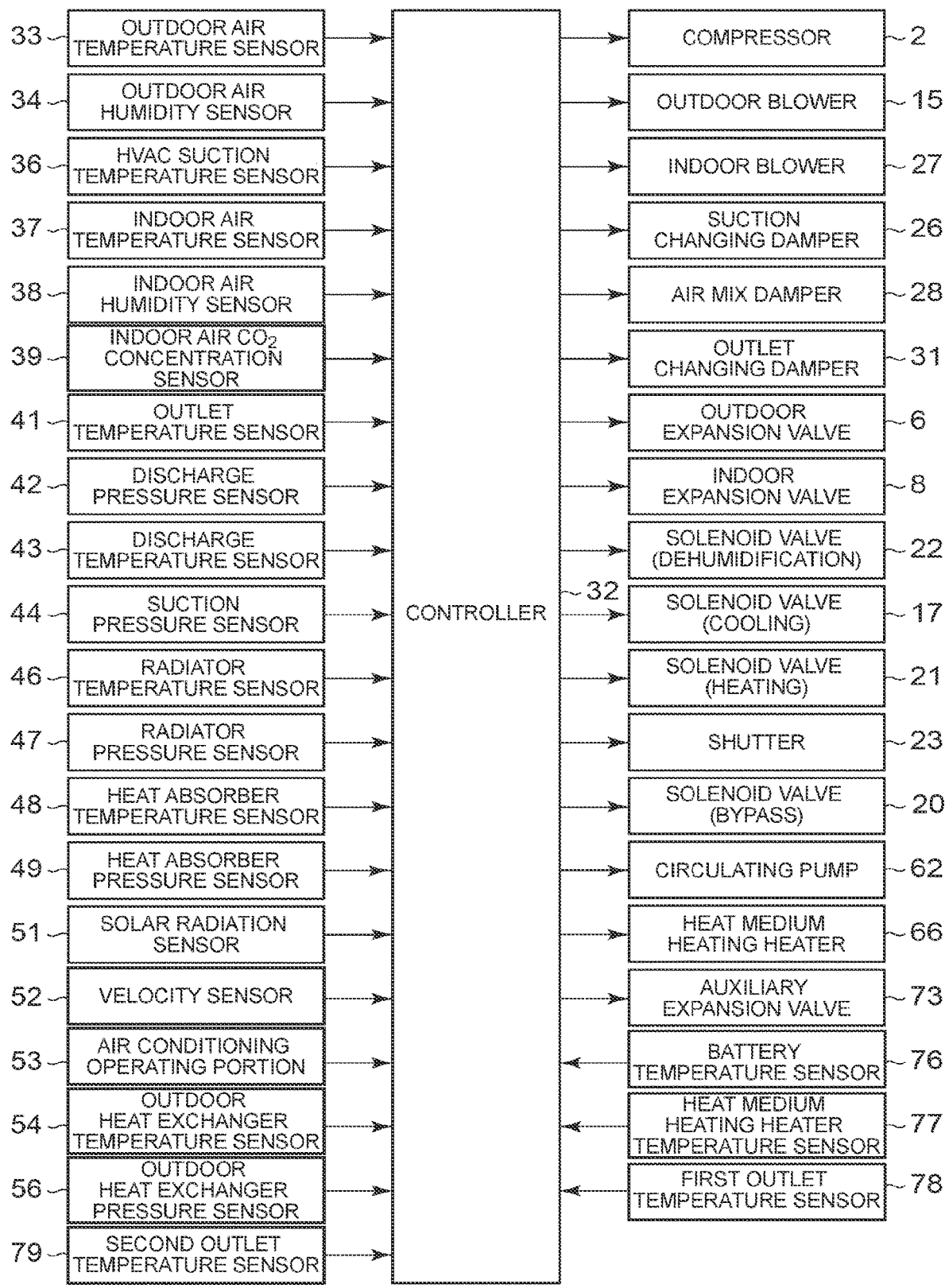
FIG. 2 is a block diagram of an electric circuit of a controller in the air conditioner for the vehicle of FIG. 1.

Next, in FIG. 2, 32 is a controller (ECU) as a control device. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction temperature sensor 44 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TCI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle interior, a velocity sensor 52 to detect a moving speed (a velocity) of the vehicle, an air conditioning (aircon) operating portion 53 to set the changing of a predetermined temperature or an air conditioning operation, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself: an outdoor heat exchanger temperature TXO. When the outdoor heat exchanger 7 functions as an evaporator, the outdoor heat exchanger temperature TXO becomes an evaporation temperature of the refrigerant in the outdoor heat exchanger 7), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

Furthermore, the input of the controller 32 is further connected also to respective outputs of a battery temperature sensor 76 which detects a temperature of the battery 55 (a temperature of the battery 55 itself, or a temperature of the heat medium flowing out from the battery 55, or a temperature of the heat medium flowing into the battery 55), a heat medium heating heater temperature sensor 77 which detects a temperature of the heat medium heating heater 66 (a temperature of the heat medium heating heater 66 itself, and a temperature of the heat medium flowing out from the heat medium heating heater 66), a first outlet temperature sensor 78 which detects a temperature of the heat medium flowing out from the heat medium flow passage 64A of the refrigerant-heat medium heat exchanger 64, and a second outlet temperature sensor 79 which detects a temperature of the refrigerant flowing out from the refrigerant flow passage 64B.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 8 (dehumidification), the solenoid valve 17 (cooling), the solenoid valve 21 (heating), and the solenoid valve 20 (bypass), the shutter 23, the circulating pump 62, the heat medium heating heater 66, and the auxiliary expansion valve 73. Then, the controller 32 controls these components on the basis of the outputs of the respective sensors and the setting input by the air conditioning operating portion 53.

Next, an operation of the air conditioner 1 for the vehicle of the embodiment, having the above constitution will be described. In the embodiment, the controller 32 changes and executes the respective air conditioning operations of the heating operation, the dehumidifying and heating operation, the internal cycle operation, the dehumidifying and cooling operation, and the cooling operation and adjusts the temperature of the battery 55 to within a predetermined appropriate temperature range. Description will initially be made as to each air conditioning operation of the refrigerant circuit R.

Heating Operation

Figure 3:
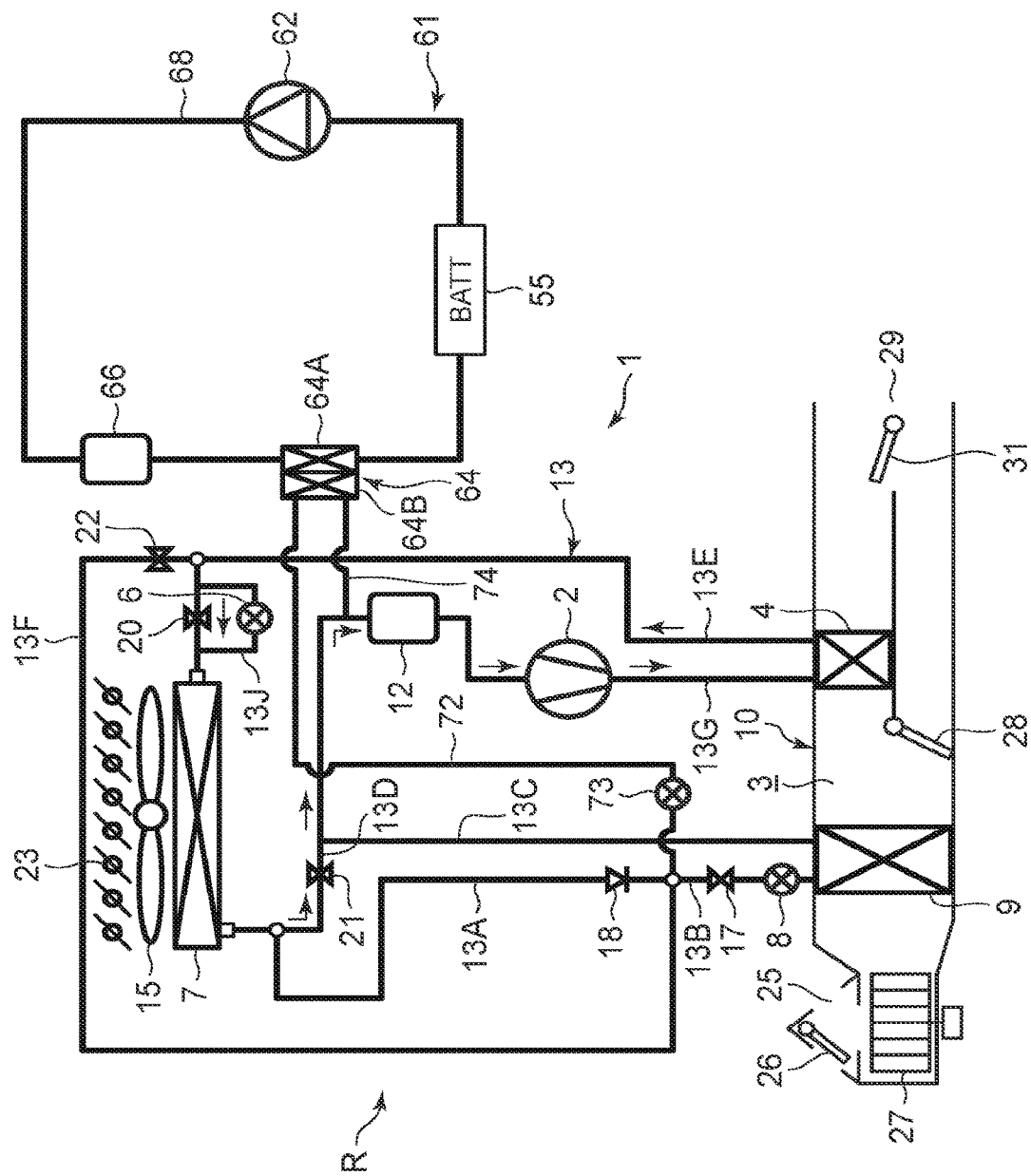
FIG. 3 is a diagram describing a heating operation by the controller of FIG. 2.
Figure 4:
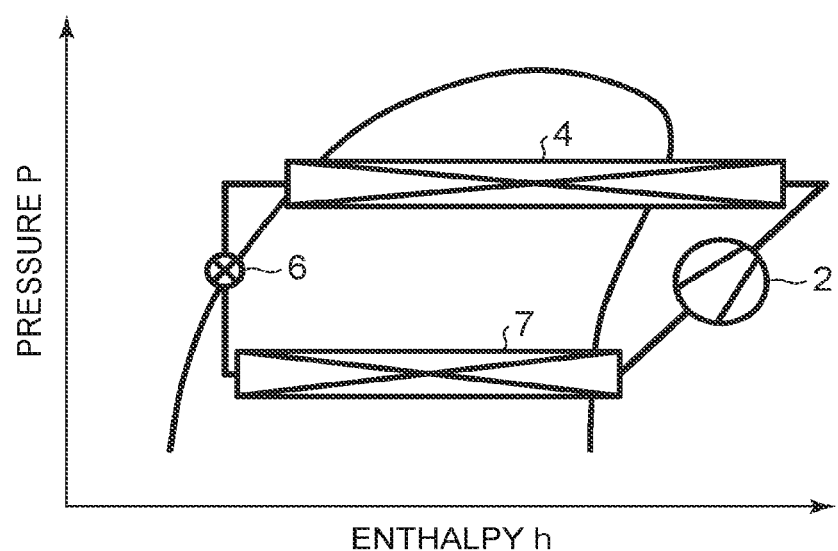
FIG. 4 is a p-h diagram of the heating operation of FIG. 3.

Description will first be made as to the heating operation with reference to FIG. 3 and FIG. 4. FIG. 3 shows the flow (solid line arrows) of the refrigerant of the refrigerant circuit R in the heating operation, and FIG. 4 shows a p-h diagram of the refrigerant circuit R in the heating operation. Incidentally, in FIG. 4, each constituent device of the refrigerant circuit R is shown on the p-h diagram. When the heating operation is selected by the controller 32 (an automatic mode) or a manual operation to the air conditioning operating portion 53 (a manual mode), the controller 32 opens the solenoid valve 21 (for the heating) and closes the solenoid valve 17 (for the cooling). The controller also closes the solenoid valve 22 (for the dehumidification) and the solenoid valve 20 (for the bypass). Incidentally, the shutter 23 is opened.

Then, the controller operates the compressor 2 and the respective blowers 15 and 27, and the air mix damper 28 has a state of adjusting a ratio at which the air blown out from the indoor blower 27 is to be passed through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 flows through the refrigerant pipe 13A, the refrigerant pipe 13D, and the solenoid valve 21, and flows from the refrigerant pipe 13C into the accumulator 12 to perform gas-liquid separation, and the gas refrigerant is then sucked into the compressor 2, thereby repeating this circulation. The air heated in the radiator 4 is blown out from the outlet 29, thereby performing the heating of the vehicle interior.

The controller 32 calculates a target radiator pressure PCO (a target value of the pressure PCI of the radiator 4) from a target radiator temperature TCO (a target value of the temperature TCI of the radiator 4) calculated from an after-mentioned target outlet temperature TAO, and controls the number of revolutions of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Furthermore, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree of the refrigerant in an outlet of the radiator 4. The target radiator temperature TCO is basically TCO=TAO, but a predetermined limit of controlling is provided.

(2) Dehumidifying and Heating Operation

Figure 5:
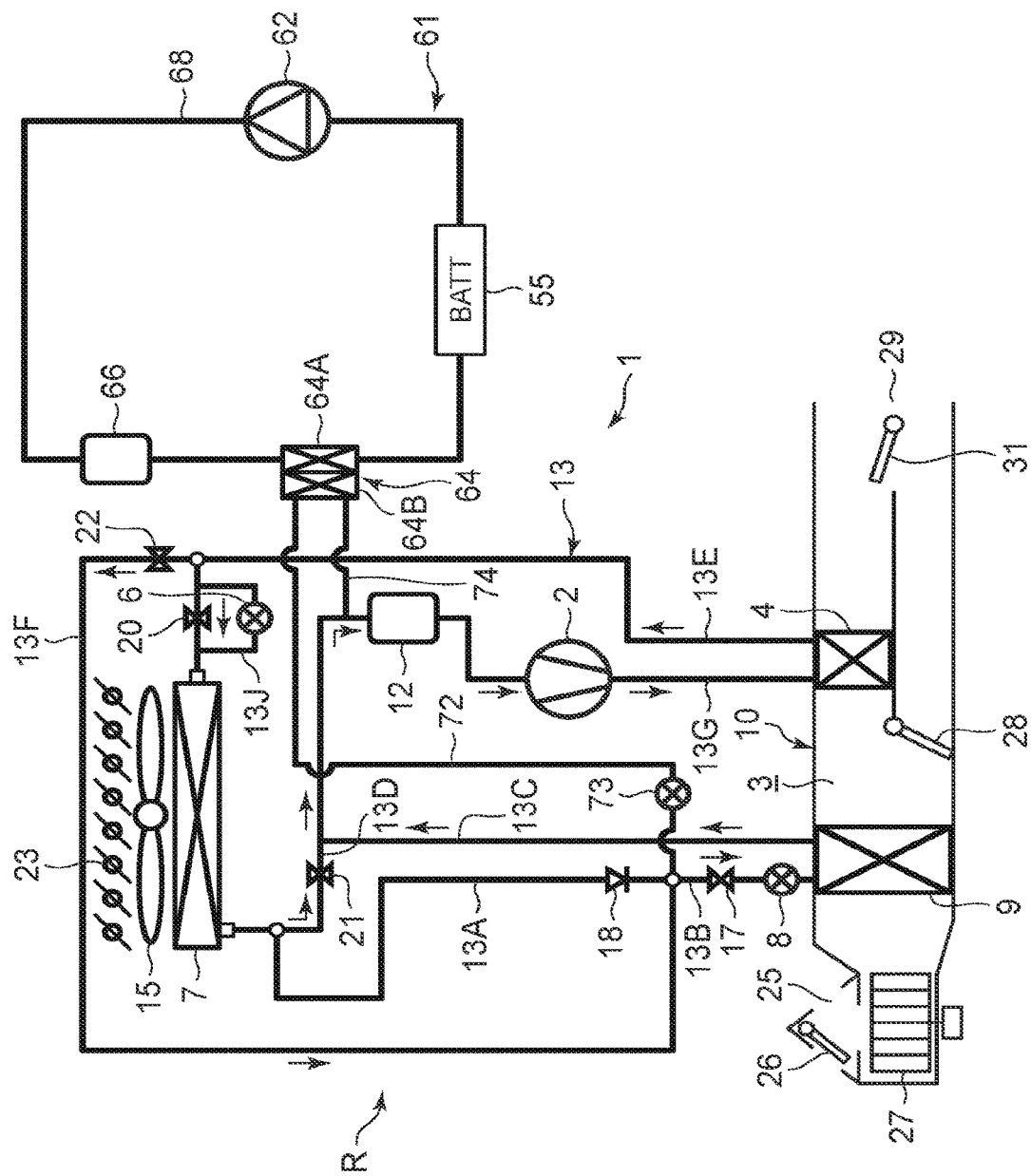
FIG. 5 is a diagram describing a dehumidifying and heating operation by the controller of FIG. 2.
Figure 6:
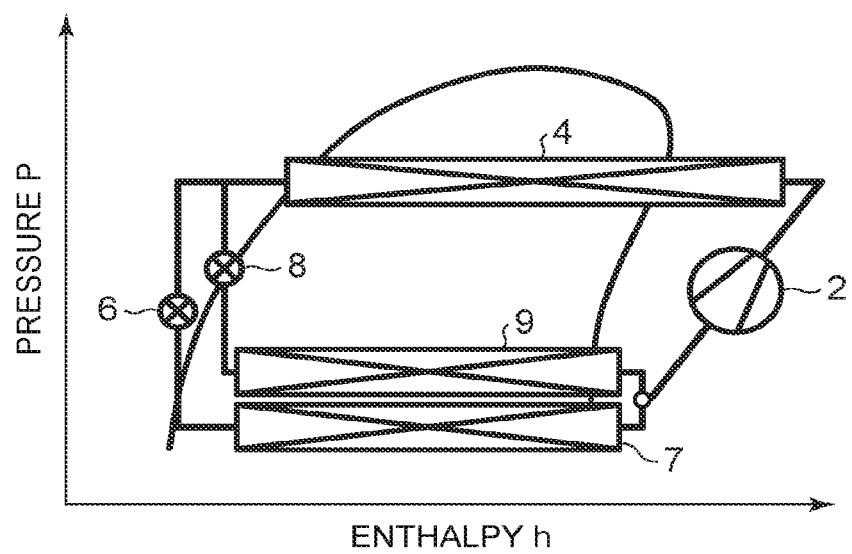
FIG. 6 is a p-h diagram of the dehumidifying and heating operation of FIG. 5.

Next, description will be made as to the dehumidifying and heating operation with reference to FIG. 5 and FIG. 6. FIG. 5 shows the flow (solid line arrows) of the refrigerant of the refrigerant circuit R in the dehumidifying and heating operation, and FIG. 6 shows a p-h diagram of the refrigerant circuit R in the dehumidifying and heating operation. Incidentally, in FIG. 6, each constituent device of the refrigerant circuit R is shown on the p-h diagram. In the dehumidifying and heating operation, the controller 32 opens the solenoid valve 22 and the solenoid valve 17 in the above state of the heating operation. Further, the shutter 23 is opened. In consequence, a part of the condensed refrigerant flowing into the refrigerant pipe 13E through the radiator 4 is distributed, the distributed refrigerant flows through the solenoid valve 22 into the refrigerant pipe 13F and flows from the refrigerant pipe 13B into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls a valve position of the indoor expansion valve 8 to maintain a superheat degree (SH) in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 flows out to the refrigerant pipe 13C to join the refrigerant (the refrigerant from the outdoor heat exchanger 7) from the refrigerant pipe 13D, and then flows through the accumulator 12 to be sucked into the compressor 2, thereby repeating this circulation. The air dehumidified in the heat absorber 9 is reheated in the process of passing the radiator 4, thereby performing the dehumidifying and heating of the vehicle interior.

The controller 32 controls the number of revolutions of the compressor 2 on the basis of the target radiator pressure PCO calculated from the target radiator temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48.

(3) Internal Cycle Operation

Figure 7:
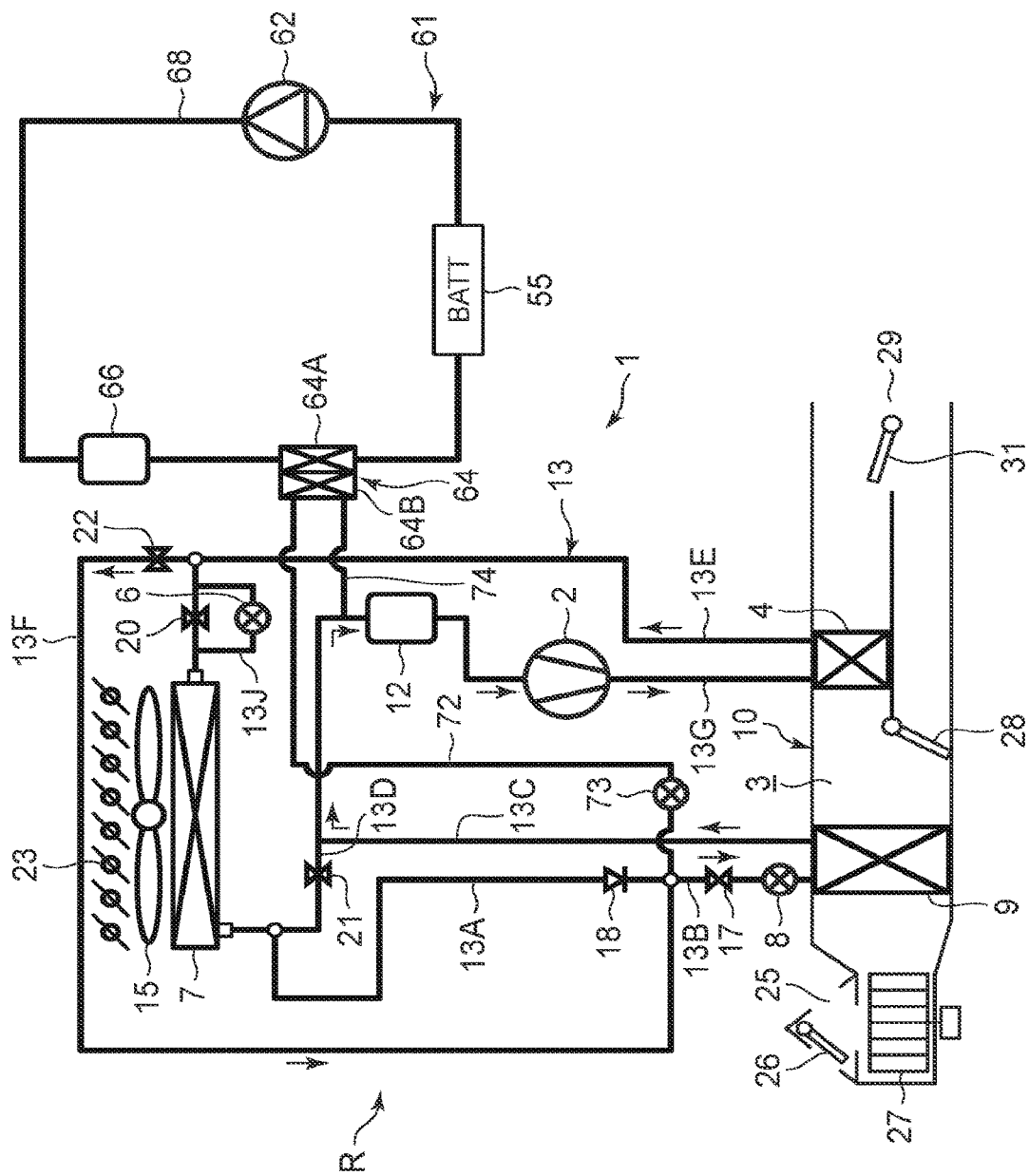
FIG. 7 is a diagram describing an internal cycle operation by the controller of FIG. 2.
Figure 8:
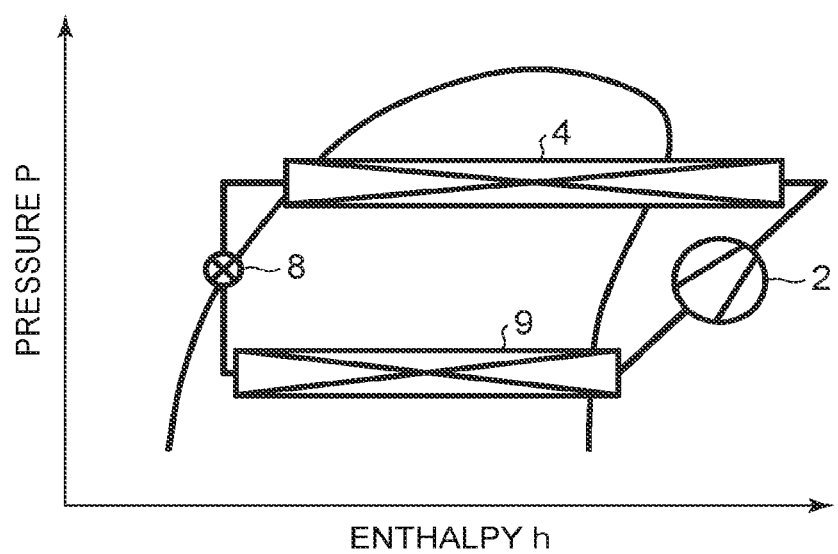
FIG. 8 is a p-h diagram of the internal cycle operation of FIG. 7.

Next, description will be made as to the internal cycle operation with reference to FIG. 7 and FIG. 8. FIG. 7 shows the flow (solid line arrows) of the refrigerant of the refrigerant circuit R in the internal cycle operation, and FIG. 8 shows a p-h diagram of the refrigerant circuit R in the internal cycle operation. Incidentally, in FIG. 8, each constituent device of the refrigerant circuit R is shown on the p-h diagram. In the internal cycle operation, the controller 32 fully closes the outdoor expansion valve 6 in the above state of the dehumidifying and heating operation (a fully-closed position). However, the solenoid valve 21 is maintained in an opened state, and the refrigerant outlet of the outdoor heat exchanger 7 is made to communicate with the refrigerant suction side of the compressor 2. That is, this internal cycle operation is a state where the outdoor expansion valve 6 is fully closed under the control of the outdoor expansion valve 6 in the dehumidifying and heating operation, and hence, this internal cycle operation can also be grasped as a part of the dehumidifying and heating operation (the shutter 23 being opened).

However, the outdoor expansion valve 6 is closed, thereby obstructing inflow of the refrigerant into the outdoor heat exchanger 7, and hence, all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows into the refrigerant pipe 13C and flows through the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle operation, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. The whole amount of the refrigerant flows through the heat absorber 9 which exerts a dehumidifying operation, and hence, as compared with the above dehumidifying and heating operation, a dehumidifying capability is higher, but the heating capability becomes low.

Further, the outdoor expansion valve 6 is closed but the solenoid valve 21 is opened, and the refrigerant outlet of the outdoor heat exchanger 7 communicates with the refrigerant suction side of the compressor 2. Hence, the liquid refrigerant in the outdoor heat exchanger 7 flows out to the refrigerant pipe 13C through the refrigerant pipe 13D and the solenoid valve 21 and is recovered to the accumulator 12, so that the outdoor heat exchanger 7 is subjected to a state of the gas refrigerant therein. Thus, as compared with the case where the solenoid valve 21 is closed, the amount of the refrigerant circulated in the refrigerant circuit R is increased, thereby making it possible to enhance the heating capability of the radiator 4 and the dehumidifying capability of the heat absorber 9.

The controller 32 controls the number of revolutions of the compressor 2 on the basis of the temperature of the heat absorber 9 or the above-mentioned radiator pressure PCI (the high pressure of the refrigerant circuit R). At this time, the controller 32 selects a smaller compressor target number of revolutions from compressor target numbers of revolutions obtainable by either of calculations from the temperature of the heat absorber 9 and the radiator pressure PCI, to control the compressor 2.

(4) Dehumidifying and Cooling Operation

Figure 9:
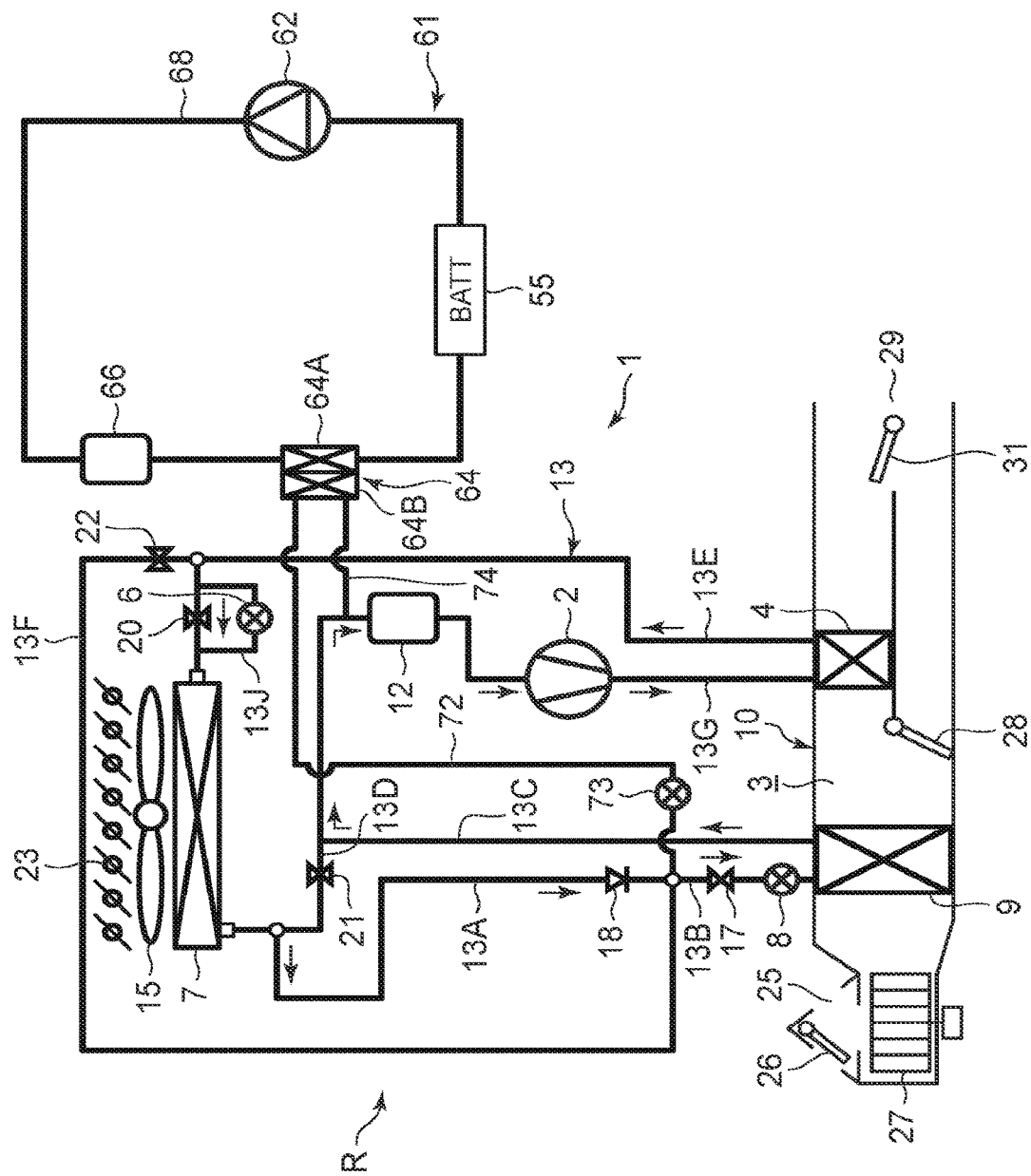
FIG. 9 is a diagram describing a dehumidifying and cooling operation by the controller of FIG. 2.
Figure 10:
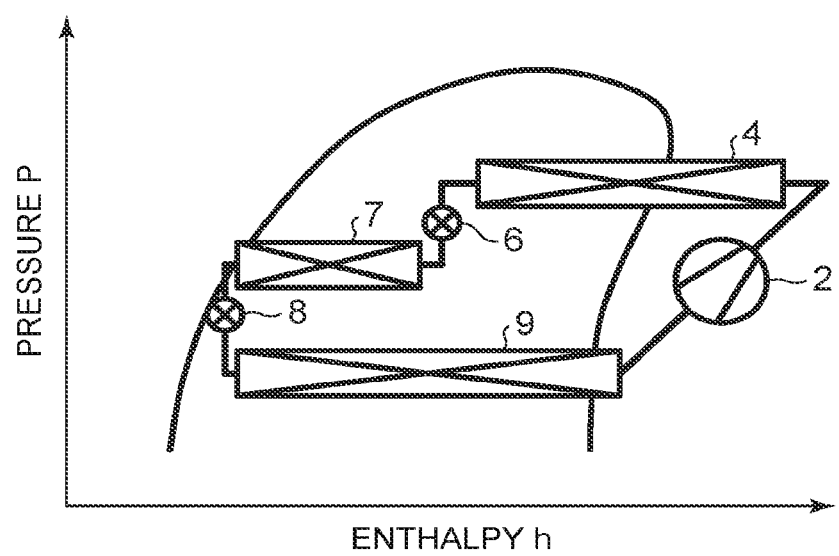
FIG. 10 is a p-h diagram of the dehumidifying and cooling operation of FIG. 9.

Next, description will be made as to the dehumidifying and cooling operation with reference to FIG. 9 and FIG. 10. FIG. 9 shows the flow (solid line arrows) of the refrigerant of the refrigerant circuit R in the dehumidifying and cooling operation, and FIG. 10 shows a p-h diagram of the refrigerant circuit R in the dehumidifying and cooling operation. Incidentally, in FIG. 10, each constituent device of the refrigerant circuit R is shown on the p-h diagram. In the dehumidifying and cooling operation, the controller 32 opens the solenoid valve 17 and closes the solenoid valve 21. The controller also closes the solenoid valve 22 and the solenoid valve 20. Then, the controller operates the compressor 2 and the respective blowers 15 and 27, and the air mix damper 28 has a state of passing the air blown out from the indoor blower 27 through the radiator 4. Further, the shutter 23 is opened. Consequently, the high-temperature high-pressure gas refrigerant discharged from the compressor 2 flows into the radiator 4. The air in the air flow passage 3 passes through the radiator 4, and hence, the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. The refrigerant flowing out from the outdoor heat exchanger 7 flows through the refrigerant pipe 13A and the check valve 18 to enter the refrigerant pipe 13B, and further flows through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (reheating: a radiation capability is lower than that during the heating), thereby performing the dehumidifying and cooling of the vehicle interior.

The controller 32 controls, based on the temperature (the heat absorber temperature Te) of the heat absorber 9 which is detected by the heat absorber temperature sensor 48, and a target heat absorber temperature TEO being its target value, the number of revolutions of the compressor 2 to set the heat absorber temperature Te to the target heat absorber temperature TEO, and controls, based on the radiator pressure PCI (the high pressure of the refrigerant circuit R) detected by the radiator pressure sensor 47 and the target radiator pressure PCO (the target value of the radiator pressure PCI) calculated from the target radiator temperature TCO, the valve position of the outdoor expansion valve 6 to set the radiator pressure PCI to the target radiator pressure PCO, thereby obtaining a required amount of reheat by the radiator 4.

(5) Cooling Operation

Figure 11:
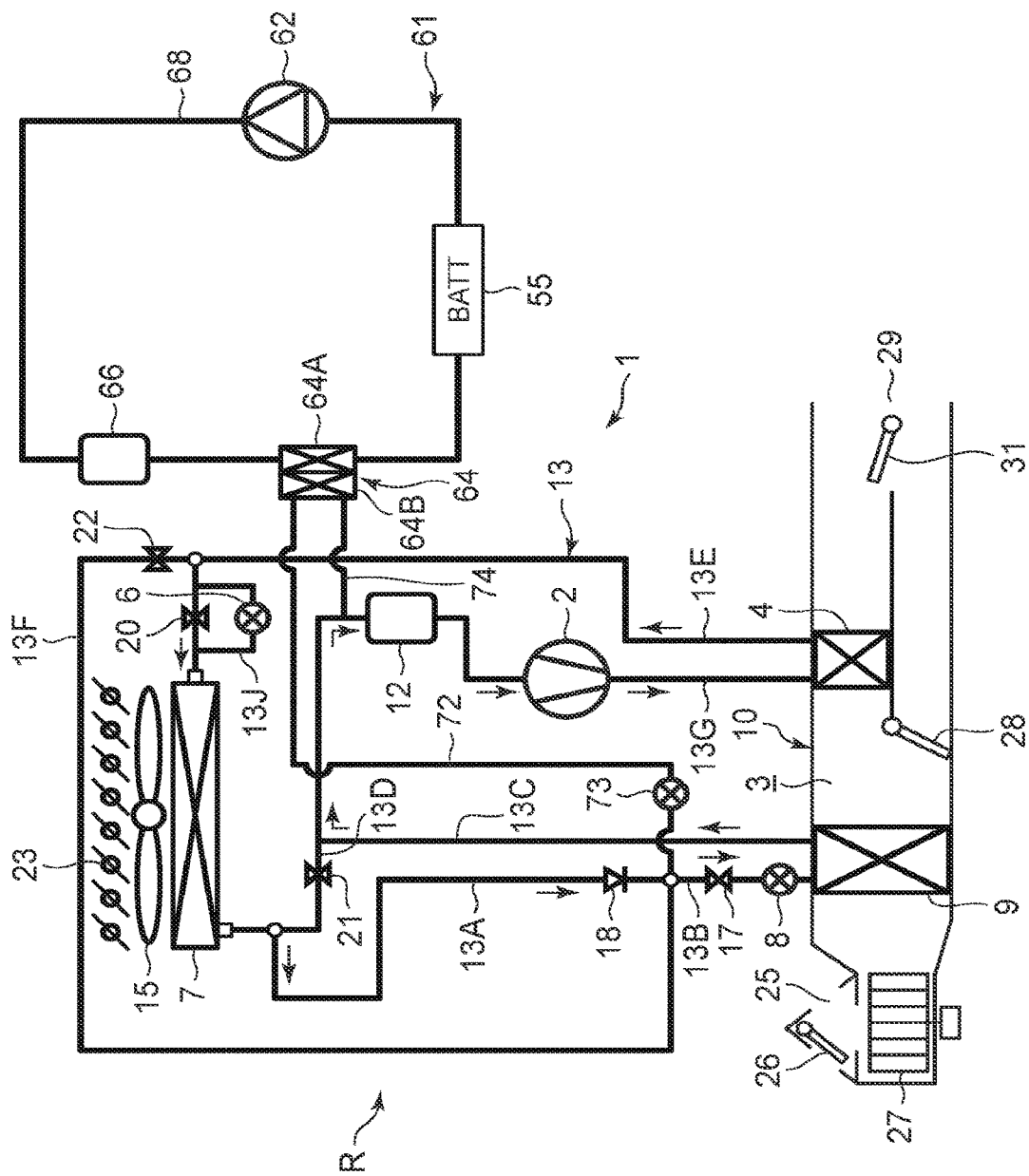
FIG. 11 is a diagram describing a cooling operation by the controller of FIG. 2.
Figure 12:
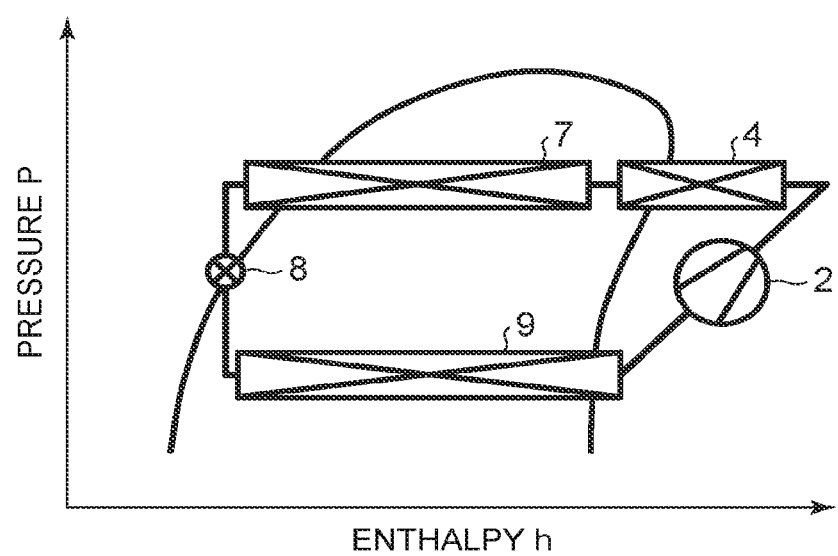
FIG. 12 is a p-h diagram of the cooling operation of FIG. 11.

Next, description will be made as to the cooling operation with reference to FIG. 11 and FIG. 12. FIG. 11 shows the flow (solid line arrows) of the refrigerant of the refrigerant circuit R in the cooling operation, and FIG. 12 shows a p-h diagram of the refrigerant circuit R in the cooling operation. Incidentally, in FIG. 12, each constituent device of the refrigerant circuit R is shown on the p-h diagram. In the cooling operation, the controller 32 opens the solenoid valve 20 in the above state of the dehumidifying and cooling operation (the valve position of the outdoor expansion valve 6 is free). It is to be noted that the air mix damper 28 has a state of adjusting a ratio at which the air is to be passed through the radiator 4. Further, the shutter 23 is opened.

In consequence, the high-temperature high-pressure gas refrigerant discharged from the compressor 2 flows into the radiator 4. The air in the air flow passage 3 is passed through the radiator 4 but its ratio becomes small (because of only reheat during the cooling). The refrigerant therefore only passes the radiator, and the refrigerant flowing out from the radiator 4 flows through the refrigerant pipe 13E to reach the outdoor expansion valve 6. At this time, the solenoid valve 20 is opened, and hence, the refrigerant flows through the solenoid valve 20 to pass the refrigerant pipe 13J, and flows into the outdoor heat exchanger 7 as it is, in which the refrigerant is cooled by the running therein or the outdoor air to pass through the outdoor blower 15, to condense and liquefy. The refrigerant flowing out from the outdoor heat exchanger 7 flows through the refrigerant pipe 13A and the check valve 18 to enter the refrigerant pipe 13B, and further flows through the solenoid valve 17 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 flows through the refrigerant pipe 13C to reach the accumulator 12, and flows therethrough to be sucked into the compressor 2, thereby repeating this circulation. The air cooled and dehumidified in the heat absorber 9 is blown out from the outlet 29 to the vehicle interior, thereby performing the cooling of the vehicle interior. In this cooling operation, the controller 32 controls the number of revolutions of the compressor 2 on the basis of the temperature (the heat absorber temperature Te) of the heat absorber 9 which is detected by the heat absorber temperature sensor 48.

(6) Changing of Air Conditioning Operation

The controller 32 calculates the above-mentioned target outlet temperature TAO from the following equation (I). The target outlet temperature TAO is a target value of the temperature of the air to be blown out from the outlet 29 to the vehicle interior.

$$TAO=(Tset-Tin) \times K+Tbal(f(Tset,SUN,Tam)) \quad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature TAO becomes.

Then, the controller 32 selects any air conditioning operation from the above respective air conditioning operations on the basis of the outdoor air temperature Tam detected by the outdoor air temperature sensor 33 and the target outlet temperature TAO on startup. Furthermore, after the startup, the controller selects and changes the above respective air conditioning operations in accordance with changes of environments and setting conditions such as the outdoor air temperature Tam and the target outlet temperature TAO.

(7) Control of Shutter 23 During Dehumidifying and Cooling Operation and Changing to Internal Cycle Operation Here, in the aforementioned dehumidifying and cooling operation, the controller 32 controls, based on the temperature (the heat absorber temperature Te) of the heat absorber 9 detected by the heat absorber temperature sensor 48 and the target heat absorber temperature TEO being its target value, the number of revolutions of the compressor 2 to set the heat absorber temperature Te to the target heat absorber temperature TEO. Accordingly, when the heat absorber temperature Te is in a state of its satisfaction (in which the heat absorber temperature Te becomes the target heat absorber temperature TEO or becomes a value close to it), the number of revolutions of the compressor 2 also becomes low.

Further, the controller 32 controls the valve position of the outdoor expansion valve 6 to set the radiator pressure PCI to the target radiator pressure PCO on the basis of the radiator pressure PCI (the high pressure of the refrigerant circuit R) detected by the radiator pressure sensor 47 and the target radiator pressure PCO (the target value of the radiator pressure PCI). Thus, the number of revolutions of the compressor 2 cannot be increased either in the state in which the heat absorber temperature Te is satisfied. Therefore, as the radiator pressure PCI becomes lower than the target radiator pressure PCO, the controller 32 reduces the valve position of the outdoor expansion valve 6 to enhance the radiation capability of the radiator 4 so that the refrigerant is made to stay in the radiator 4 as much as possible.

However, since the amount of the refrigerant circulated in the heat absorber 9 decreases as the valve position of the outdoor expansion valve 6 becomes small, a temperature spot occurs in the heat absorber 9. Then, when the valve position of the outdoor expansion valve 6 is reduced to the minimum valve position of controlling, the temperature spot of the heat absorber 9 becomes extremely large, thereby deteriorating air conditioning performance of the vehicle interior (the temperature of the air blown out through the outlet varies). In particular, since the radiation capability of the radiator 4 becomes low by exchange of heat between the refrigerant and the outdoor air in the outdoor heat exchanger 7 as mentioned above in the dehumidifying and cooling operation, such a problem is easy to occur in the cases such as where the outdoor air temperature being lowered, etc., thereby leading to early transition to the internal cycle operation or the dehumidifying and heating operation. In order to prevent such a thing, there is a need to heat the air blown out to the vehicle interior by providing a special electric heater or the like, but power consumption is increased correspondingly.

Figure 13:
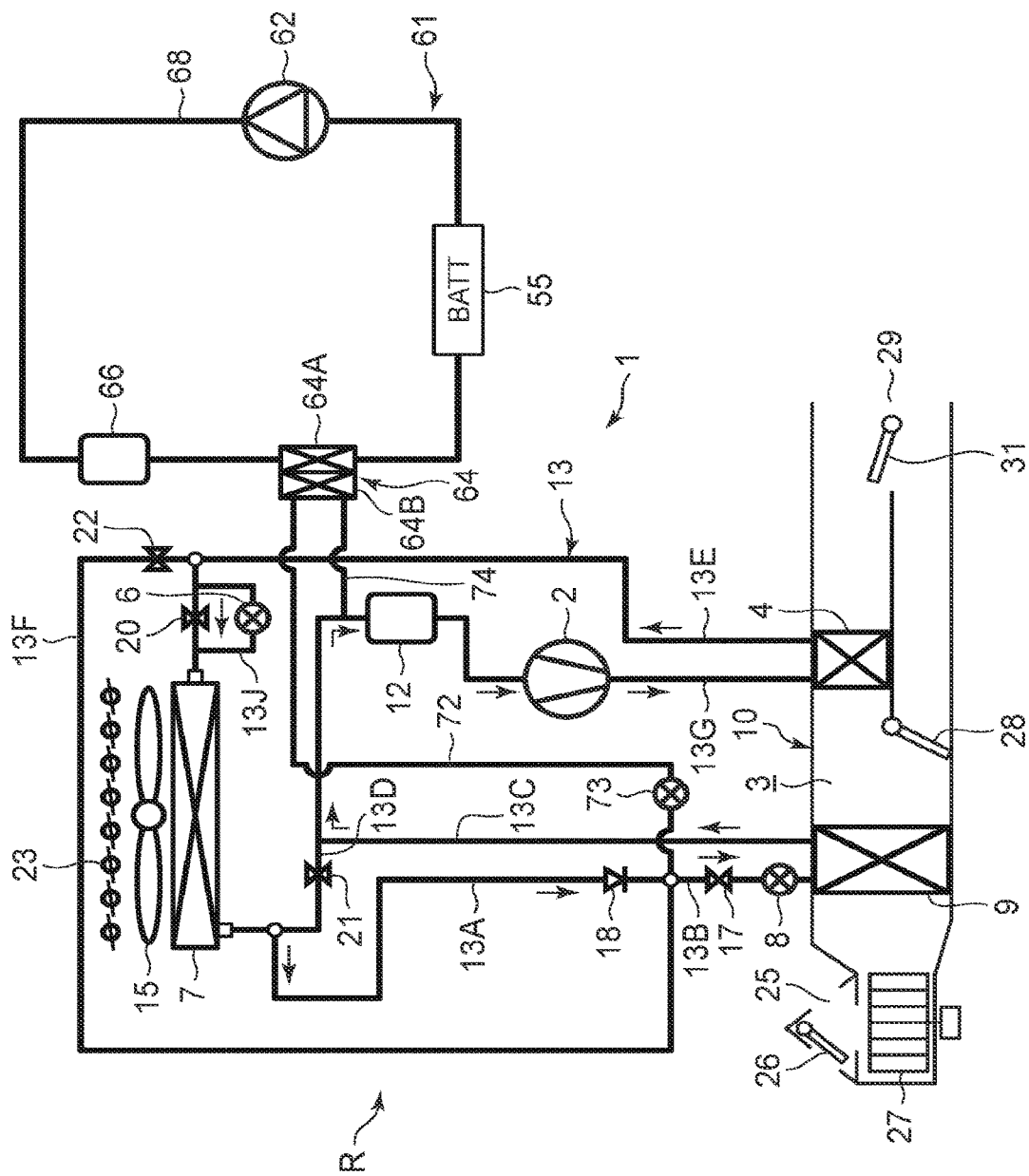
FIG. 13 is a diagram describing a dehumidifying and cooling operation (shutter being closed) by the controller of FIG. 2.

Thus, when it is not possible to set the radiator pressure PCI to the target radiator pressure PCO (i.e., when it is not possible to reach the target radiator pressure PCO under the control of the outdoor expansion valve 6) in the dehumidifying and cooling operation of FIGS. 9 and 10 even when the valve position of the outdoor expansion valve 6 is reduced, in the present embodiment, when the radiator pressure PCI cannot be set to the target radiator pressure PCO even when the valve position of the outdoor expansion valve 6 is taken as the minimum valve position of controlling in the state in which the heat absorber temperature Te is satisfied, the controller 32 judges that the radiation capability of the radiator 4 becomes insufficient, and closes the shutter 23 and also stops the outdoor blower 15 as shown in FIG. 13.

Figure 14:
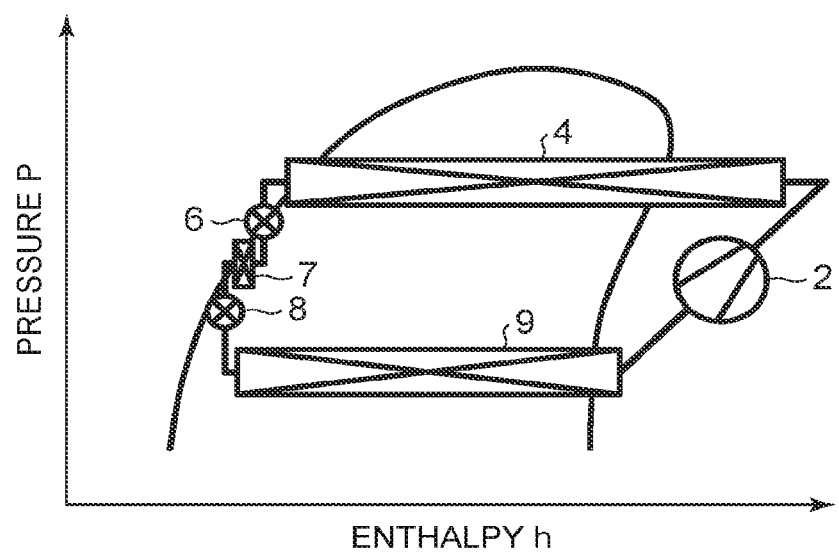
FIG. 14 is a p-h diagram of the dehumidifying and cooling operation of FIG. 13.

Consequently, the running air does not flow into the outdoor heat exchanger 7, and the outdoor air is not passed therethrough. Therefore, as shown in the p-h diagram of FIG. 14, the exchange of heat between the refrigerant and the outdoor air in the outdoor heat exchanger 7 is absent, or the amount of heat exchange between the refrigerant and the outdoor air in the outdoor heat exchanger 7 becomes extremely small. Since the amount of radiation of the refrigerant in the radiator 4 increases correspondingly, the valve position of the outdoor expansion valve 6 is greatly reduced, or the radiator pressure PCI can be set to the target radiator pressure PCO even without taking the minimum valve position, thereby making it possible to eliminate or suppress even the temperature spot which occurs in the heat absorber 9.

Further, the shutter 23 is closed in this manner, thereby making it possible to extend the dehumidifying and cooling operation and enlarge its executable range without using the special electric heater or the like. When, however, the radiator pressure PCI cannot be set to the target radiator pressure PCO even when the shutter 23 is closed as described above, the controller 32 changes the air conditioning operation to the internal cycle operation in FIGS. 7 and 8. Thus, the amount of the refrigerant circulated in the radiator 4 (on the high pressure side of the refrigerant circuit R) is increased more than in the dehumidifying and cooling operation, and the radiation capability of the radiator 4 is increased, thereby maintaining comfortable air conditioning of the vehicle interior.

Incidentally, in the present embodiment, when the radiator pressure PCI cannot be set to the target radiator pressure PCO even when the valve position of the outdoor expansion valve 6 is reduced to the minimum valve position of controlling in the state in which the heat absorber temperature Te is satisfied, the controller judges that the radiation capability of the radiator 4 runs short. However, when the radiator pressure PCI cannot be set to the target radiator pressure PCO even when the valve position of the outdoor expansion valve 6 is simply reduced to a predetermined small value in the dehumidifying and cooling operation regardless of the heat absorber temperature Te, or when the radiator pressure PCI cannot be set to a value close to the target radiator pressure PCO, the controller may judge that the radiation capability of the radiator 4 runs short.

(8) Temperature Adjustment of Battery 55

Next, description will be made as to temperature adjustment control of the battery 55 by the controller 32 with reference to FIGS. 15 to 36. When the battery 55 performs charging/discharging in a state in which its temperature becomes high due to its self-heat generation or the like as described above, its deterioration progresses. Thus, the controller 32 of the air conditioner 1 for the vehicle of the present invention cools the temperature of the battery 55 to within an appropriate temperature range by the battery temperature adjustment device 61 while executing the air conditioning operation as described above. It is to be noted that since the appropriate temperature range of the battery 55 is generally from above +25° C. to below +45°, the target battery temperature TBO (e.g., +35° C.) being the target value of the temperature (the battery temperature Tb) of the battery 55 is set to within the appropriate temperature range in the embodiment.

(8-1) First Heating/Battery Cooling Mode

In the heating operation (FIGS. 3 and 4), the controller 32 calculates a required heating capability Qtgtq being the heating capability of the vehicle interior required for the radiator 4, and a heating capability Qhp generable by the radiator 4 by using the following equations (II) and (III), for example.

$$Qtgt = (TCO - Te) \times Cpa \times \rho \times Qair \qquad (II)$$

$$Qhp = f(Tam, NC, BLV, VSP, FANVout, Te) \qquad (III)$$

where Te is a temperature of the heat absorber 9 detected by the heat absorber temperature sensor 48, Cpa is a specific heat of air flowing into the radiator 4 [kj/kg·K], ρ is a density of the air flowing into the radiator 4 (specific volume) [kg/m$^3$], Qair is an amount of the air passing through the radiator 4 [m$^3$/h] (estimated from the blower voltage BLV of the indoor blower 27, etc.), VSP is a velocity obtained from the velocity sensor 52, and FANVout is a voltage of the outdoor blower 15.

Further, the controller 32 calculates a required battery cooling capability Qbat being a cooling capability of the battery 55 required for the battery temperature adjustment device 61 by using, for example, the following equation (IV) on the basis of the temperature (the battery temperature Tb) of the battery 55 detected by the battery temperature sensor 76 and the above-mentioned target battery temperature TBO.

$$Qbat = (Tb - TBO) \times k1 \times k2 \qquad (IV)$$

where k1 is a specific heat of the heat medium circulated in the battery temperature adjustment device 61 [kj/kg·K], and k2 is a flow rate of the heat medium [m$^3$/h]. Incidentally, the equation of calculating the required battery cooling capability Qbat is not limited to the above, but the required battery cooling capability may be calculated in addition to other factors related to battery cooling other than the above.

When the battery temperature Tb is lower than the target battery temperature TBO (Tb<TBO), the required battery cooling capability Qbat calculated in the above equation (IV) becomes minus, and hence, in the embodiment, the controller 32 fully closes the auxiliary expansion valve 73 and also stops the battery temperature adjustment device 61. On the other hand, when the battery temperature Tb rises by charging/discharging or the like and becomes higher than the target battery temperature TBO during the above-described heating operation (TBO<Tb), the required battery cooling capability Qbat calculated in the equation (IV) is turned plus, and hence, in the embodiment, the controller 32 opens the auxiliary expansion valve 73 and operates the battery temperature adjustment device 61 to start the cooling of the battery 55. In that case, the controller 32 compares both of the above-described required heating capability Qtgt and required battery cooling capability Qbat on the basis of the required heating capability Qtgt and the required battery cooling capability Qbat, and changes and executes the first heating/battery cooling mode described here, and a second heating/battery cooling mode and a third heating/battery cooling mode to be described later.

Figure 15:
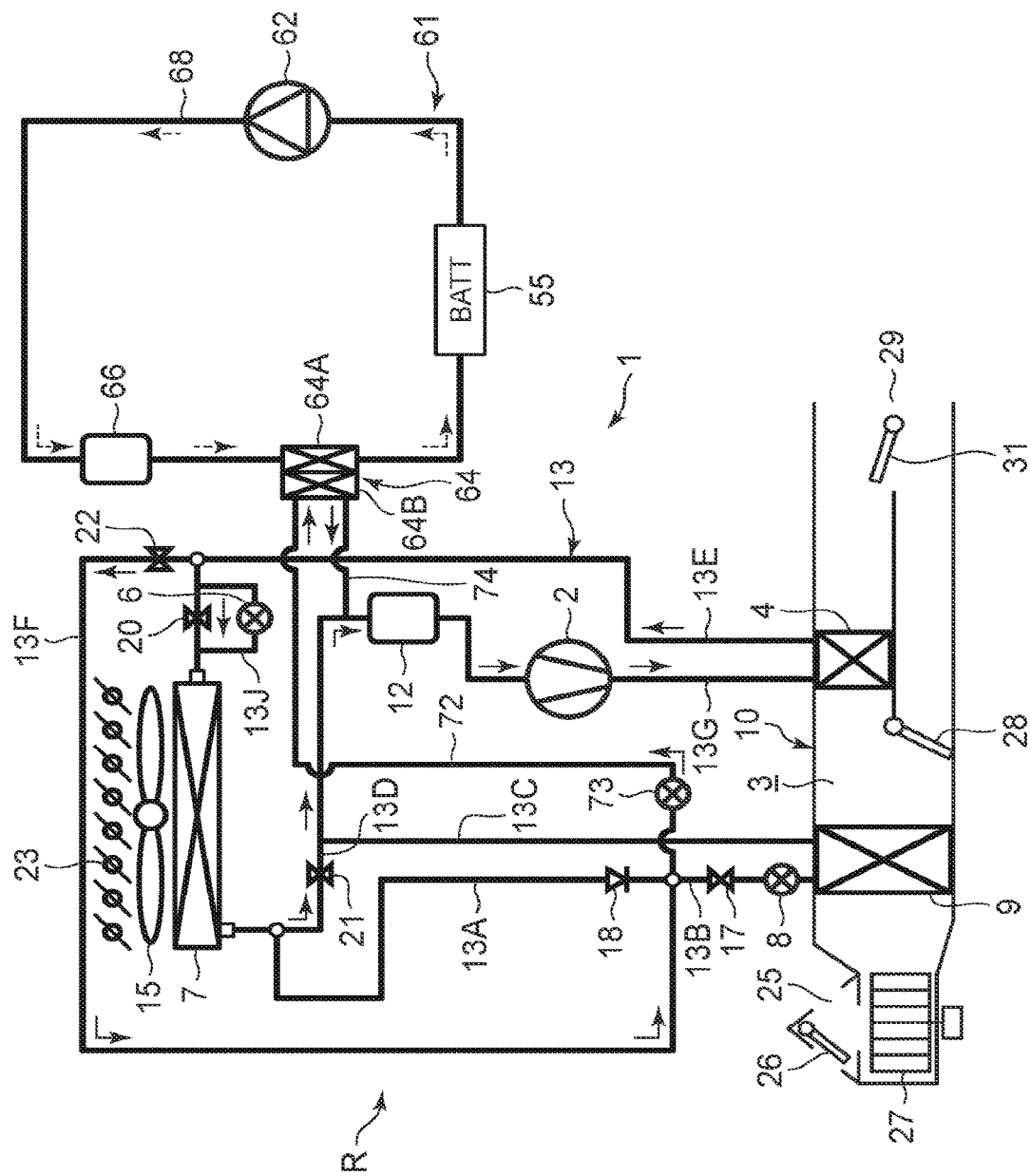
FIG. 15 is a diagram describing a first heating/battery cooling mode by the controller of FIG. 2.
Figure 16:
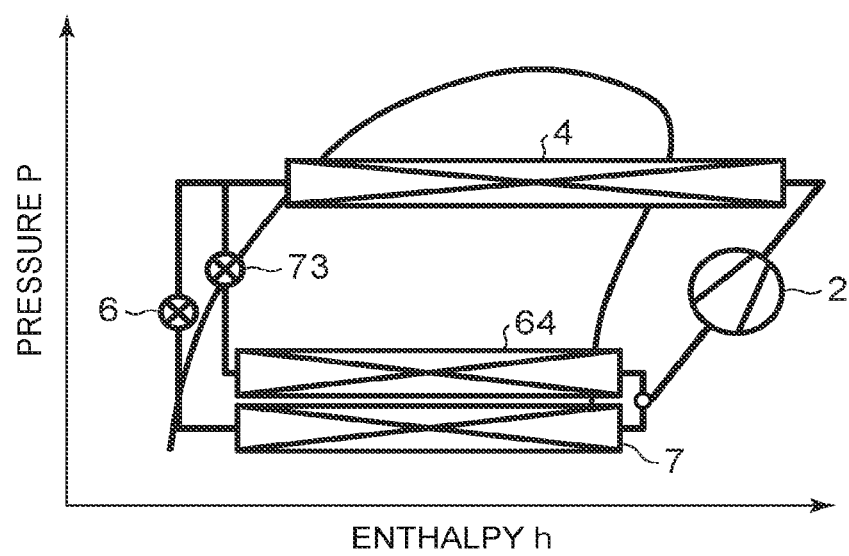
FIG. 16 is a p-h diagram of the first heating/battery cooling mode of FIG. 15.

Firstly, when the required heating capability Qtgt is larger than the required battery cooling capability Qbat in the situation in which a heating load of the vehicle interior is large (e.g., the temperature of indoor air is low), and the amount of heat generated from the battery 55 is small (a cooling load is small) (Qtgt>Qbat), the controller 32 executes the first heating/battery cooling mode. FIG. 15 shows the flow (solid line arrows) of the refrigerant of the refrigerant circuit R in the first heating/battery cooling mode, and the flow (broken line arrows) of the heat medium of the battery temperature adjustment device 61. FIG. 16 shows a p-h diagram of the refrigerant circuit R in the first heating/battery cooling mode. Incidentally, in FIG. 16, each constituent device of the refrigerant circuit R is shown on the p-h diagram.

In the first heating/battery cooling mode, the controller 32 has a state of, in the state of the heating operation of the refrigerant circuit R shown in FIGS. 3 and 4, further opening the solenoid valve 22 and also opening the auxiliary expansion valve 73 to control its valve position. Then, the controller operates the circulating pump 62 of the battery temperature adjustment device 61. Consequently, a part of the refrigerant flowing out from the radiator 4 is distributed on a refrigerant upstream side of the outdoor expansion valve 6 and flows through the refrigerant pipe 13F to reach a refrigerant upstream side of the solenoid valve 17. The refrigerant then enters the branch pipe 72 and is decompressed in the auxiliary expansion valve 73 and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 15).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 15).

Thus, in the first heating/battery cooling mode, the refrigerant of the refrigerant circuit R evaporates in the outdoor heat exchanger 7 and the refrigerant-heat medium heat exchanger 64 and absorbs heat from the outdoor air, and absorbs heat even from the heat medium (battery 55) of the battery temperature adjustment device 61. Consequently, the heat is pumped up from the battery 55 through the heat medium, and the pumped-up heat can be transferred to the radiator 4 and utilized for the heating of the vehicle interior, while cooling the battery 55.

In the first heating/battery cooling mode, when it is not possible to achieve the required heating capability Qtgt by the above-described heating capability Qhp of radiator 4 even by the heat absorption from the outdoor air and the heat absorption from the battery 55 as described above (Qtgt>Qhp), the controller 32 allows the heat medium heating heater 66 to generate heat (energization).

When the heat medium heating heater 66 generates heat, the heat medium discharged from the circulating pump 62 of the battery temperature adjustment device 61 is heated in the heat medium heating heater 66 and then flows into the heat medium flow passage 64A of the refrigerant-heat medium heat exchanger 64. Hence, the heat of the heat medium heating heater 66 is also pumped up by the refrigerant evaporated in the refrigerant flow passage 64B, whereby the heating capability Qhp by the radiator 4 is increased, thereby making it possible to achieve the required heating capability Qtgt. Incidentally, the controller 32 stops the heat generation of the heat medium heating heater 66 when the required heating capability Qtgt has been achieved for the heating capability Qhp (non-energization).

(8-2) Third Heating/Battery Cooling Mode

Figure 17:
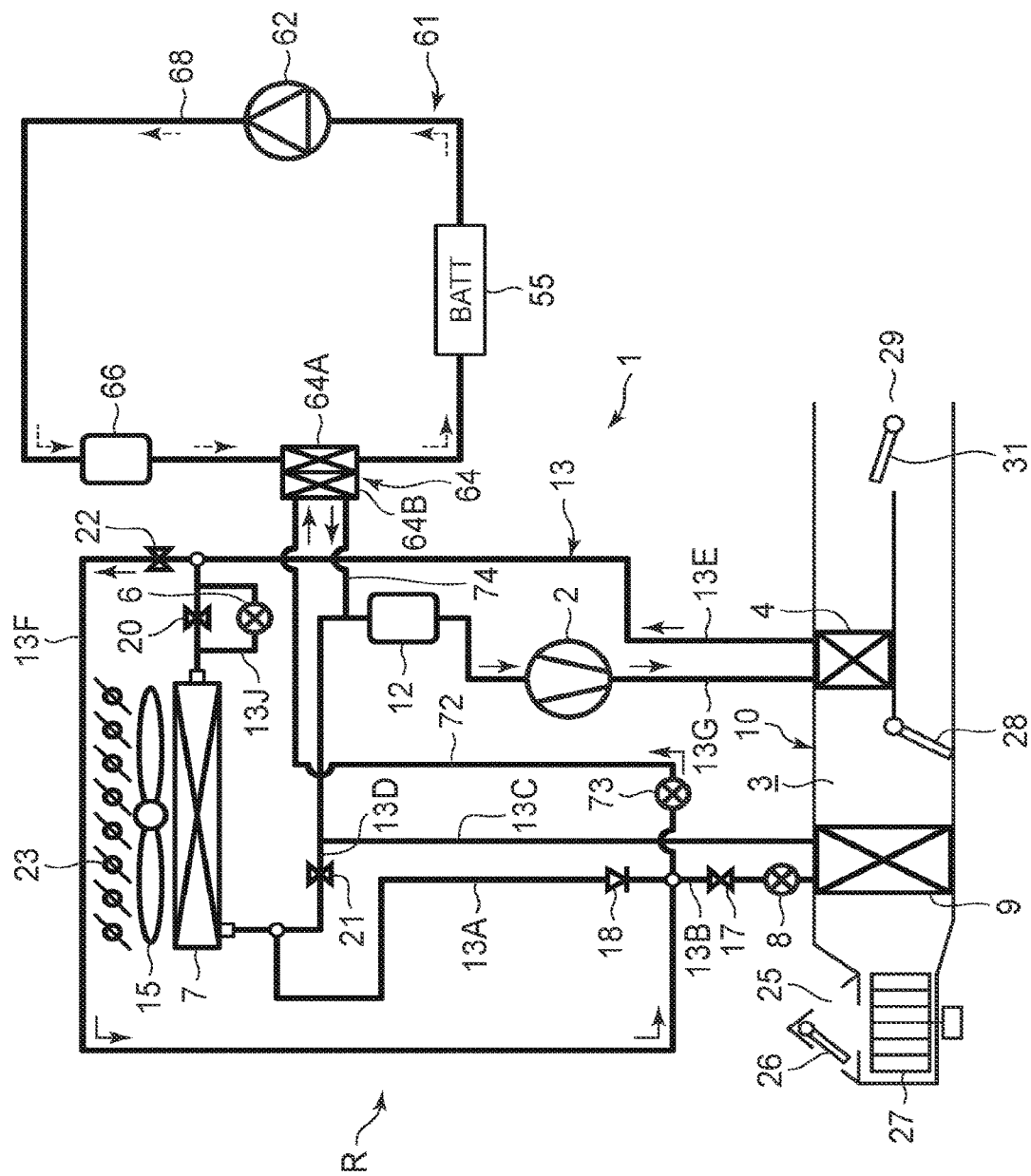
FIG. 17 is a diagram describing a third heating/battery cooling mode by the controller of FIG. 2.
Figure 18:
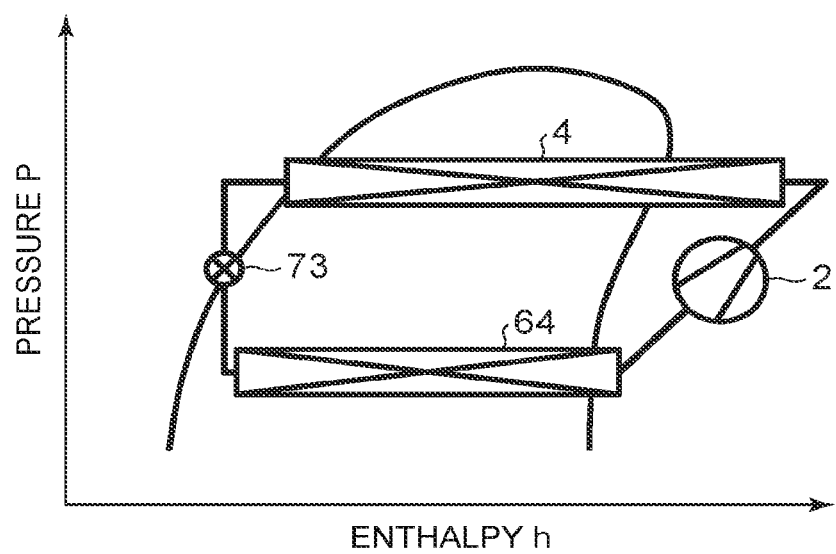
FIG. 18 is a p-h diagram of the third heating/battery cooling mode of FIG. 17.

Next, when the heating load of the vehicle interior and the cooling load of the battery 55 are almost the same, i.e., when the required heating capability Qtgt and the required battery cooling capability Qbat are equal or close to each other (Qtgt≈Qbat), the controller 32 executes the third heating/battery cooling mode. FIG. 17 shows the flow of the refrigerant of the refrigerant circuit R in the third heating/battery cooling mode (solid line arrows), and the flow of the heat medium of the battery temperature adjustment device 61 (broken line arrows). FIG. 18 illustrates a p-h diagram of the refrigerant circuit R in the third heating/battery cooling mode. Incidentally, in FIG. 18, each constituent device of the refrigerant circuit R is shown on the p-h diagram.

In the third heating/battery cooling mode, the controller 32 has a state of closing the solenoid valves 17, 20, and 21, fully closing the outdoor expansion valve 6, opening the solenoid valve 22, and also opening the auxiliary expansion valve 73 to control its valve position. Then, the controller operates the compressor 2 and the indoor blower 27 and also operates the circulating pump 62 of the battery temperature adjustment device 61 (the heat medium heating heater 66 being non-energized). Consequently, all the refrigerant flowing out from the radiator 4 flows into the solenoid valve 22 and reaches the refrigerant upstream side of the solenoid valve 17 through the refrigerant pipe 13F. The refrigerant then enters the branch pipe 72 and is decompressed in the auxiliary expansion valve 73, and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 17).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 18).

Thus, in the third heating/battery cooling mode, the refrigerant of the refrigerant circuit R evaporates in the refrigerant-heat medium heat exchanger 64 and absorbs heat from only the heat medium (battery 55) of the battery temperature adjustment device 61. Consequently, the refrigerant does not flow into the outdoor heat exchanger 7, and pumps up the heat from only the battery 55 through the heat medium. Therefore, while eliminating the problem of frosting to the outdoor heat exchanger 7, the battery 55 is cooled and the heat pumped up from the battery 55 is transferred to the radiator 4, thereby making it possible to heat the vehicle interior.

(8-3) Second Heating/Battery Cooling Mode

Figure 19:
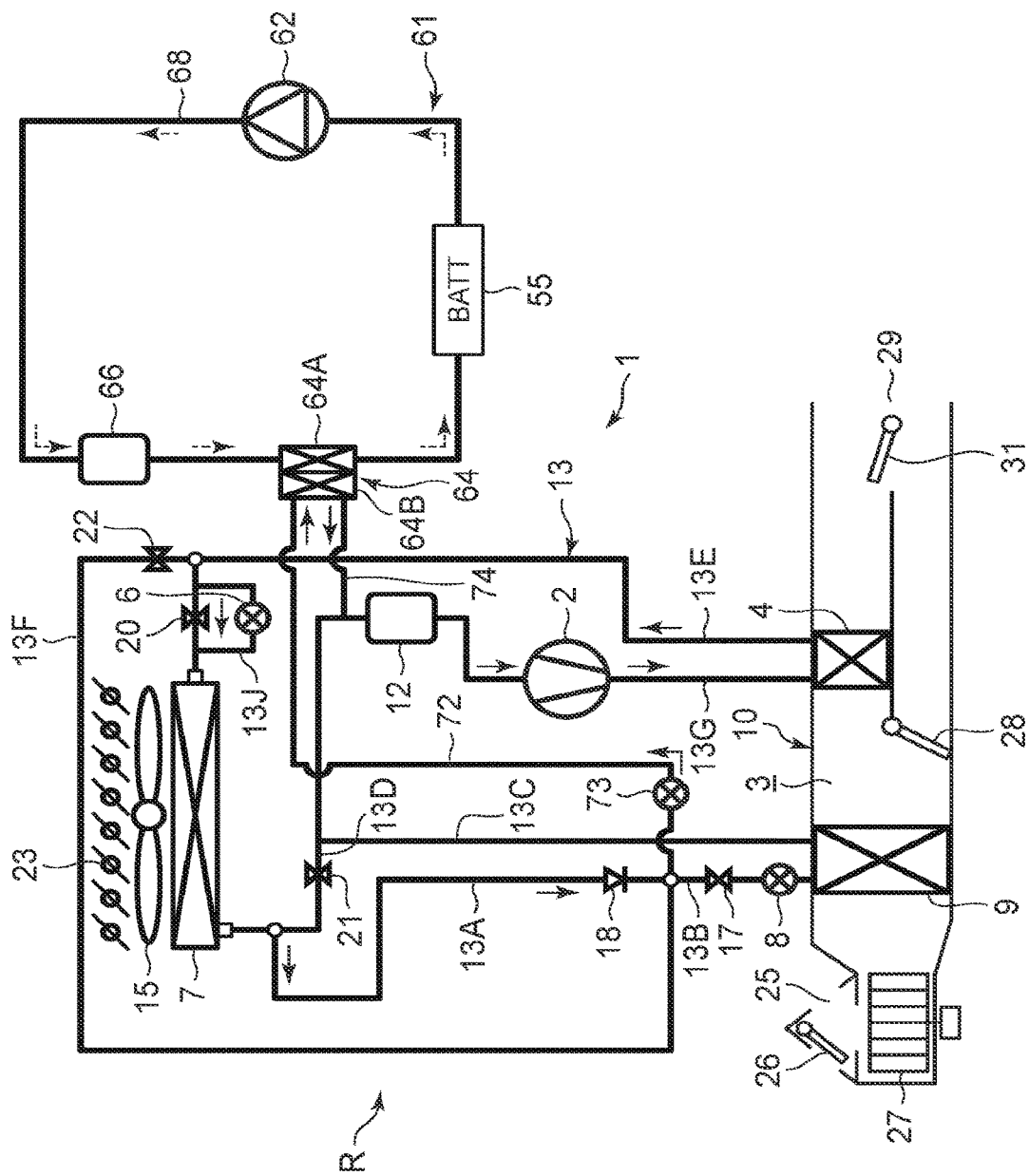
FIG. 19 is a diagram describing a second heating/battery cooling mode by the controller of FIG. 2.
Figure 20:
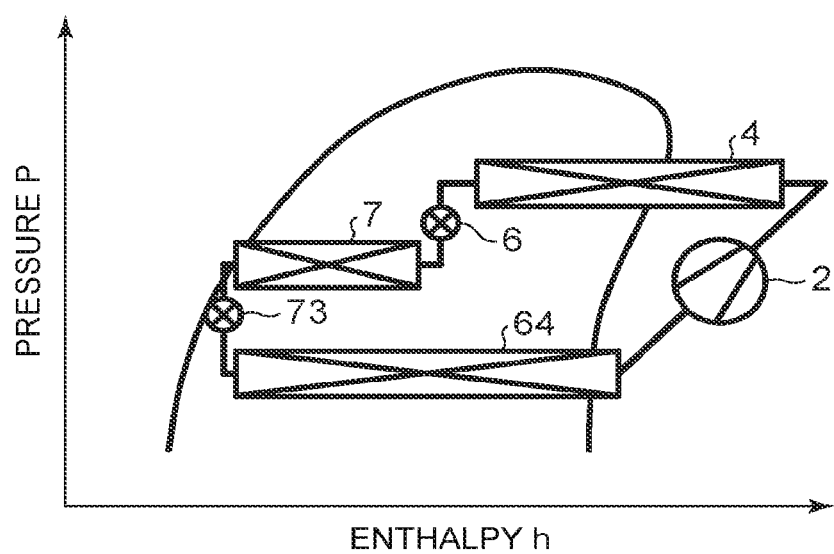
FIG. 20 is a p-h diagram of the second heating/battery cooling mode of FIG. 19.

Next, when the heating load of the vehicle interior is small (e.g., the temperature of indoor air is relatively high), and the amount of heat generation of the battery 55 is large (the cooling load is large), i.e., when the required battery cooling capability Qbat is larger than the required heating capability Qtgt (Qtgt<Qbat), the controller 32 executes the second heating/battery cooling mode. FIG. 19 shows the flow (solid line arrows) of the refrigerant of the refrigerant circuit R in the second heating/battery cooling mode, and the flow (broken line arrows) of the heat medium of the battery temperature adjustment device 61. FIG. 20 shows a p-h diagram of the refrigerant circuit R in the second heating/battery cooling mode. Incidentally, in FIG. 20, each constituent device of the refrigerant circuit R is shown on the p-h diagram.

In the second heating/battery cooling mode, the controller 32 has a state of closing the solenoid valves 17, 20, 21, and 22, opening the outdoor expansion valve 6, and also opening the auxiliary expansion valve 73 to control its valve position. Then, the controller operates the compressor 2, the outdoor blower 15, and the indoor blower 27, opens the shutter 23, and also operates the circulating pump 62 of the battery temperature adjustment device 61 (the heat medium heating heater 66 being non-energized). Consequently, the refrigerant flowing out from the radiator 4 flows through the outdoor expansion valve 6 into the outdoor heat exchanger 7 and flows through the refrigerant pipe 13A to reach the refrigerant upstream side of the solenoid valve 17. The refrigerant then enters the branch pipe 72 and is decompressed in the auxiliary expansion valve 73 and then flows through the branch pipe 72 into the refrigerant flow passage 64B of the refrigerant-heat medium heat exchanger 64 to evaporate. At this time, a heat absorbing operation is exerted. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 19).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed therefrom by the refrigerant evaporated in the refrigerant flow passage 64B, whereby the heat medium is cooled. The heat medium cooled by the heat absorbing operation of the refrigerant flows out from the refrigerant-heat medium heat exchanger 64 and reaches the battery 55 to cool the battery 55, and the heat medium is then sucked into the circulating pump 62, thereby repeating this circulation (indicated by the broken line arrows in FIG. 20).

Thus, in the second heating/battery cooling mode, the refrigerant of the refrigerant circuit R radiates heat in the radiator 4 and the outdoor heat exchanger 7 and evaporates in the refrigerant-heat medium heat exchanger 64, and absorbs heat from the heat medium (battery 55) of the battery temperature adjustment device 61. The controller 32 controls the operation (the number of revolutions NC) of the compressor 2 on the basis of the battery temperature Tb detected by the battery temperature sensor 76, and the target battery temperature TBO to adjust the cooling capability of the battery 55 by the battery temperature adjustment device 61.

Further, the valve position of the outdoor expansion valve 6 is controlled to control the circulation of the refrigerant in the radiator 4 and thereby to adjust the amount of heat radiation of the refrigerant in the radiator 4. The valve position of the auxiliary expansion valve 73 is controlled to control the circulation of the refrigerant in the outdoor heat exchanger 7 and thereby to adjust the amount of heat radiation of the refrigerant in the outdoor heat exchanger 7. Consequently, it is possible to cool the battery 55 to thereby discard its heat into the outdoor air, and also perform the heating of the vehicle interior.

Figure 21:
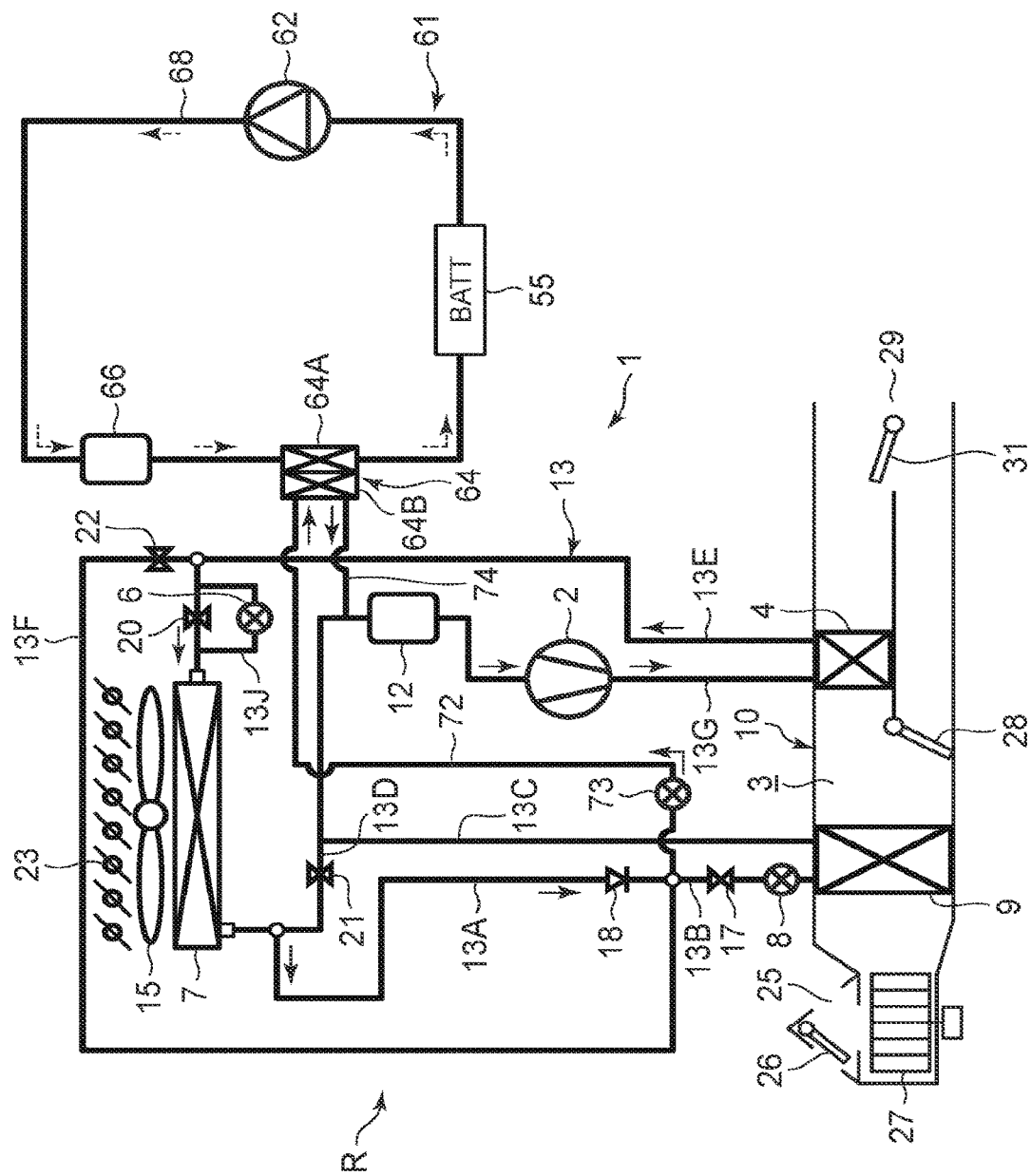
FIG. 21 is another diagram describing the second heating/battery cooling mode by the controller of FIG. 2.
Figure 22:
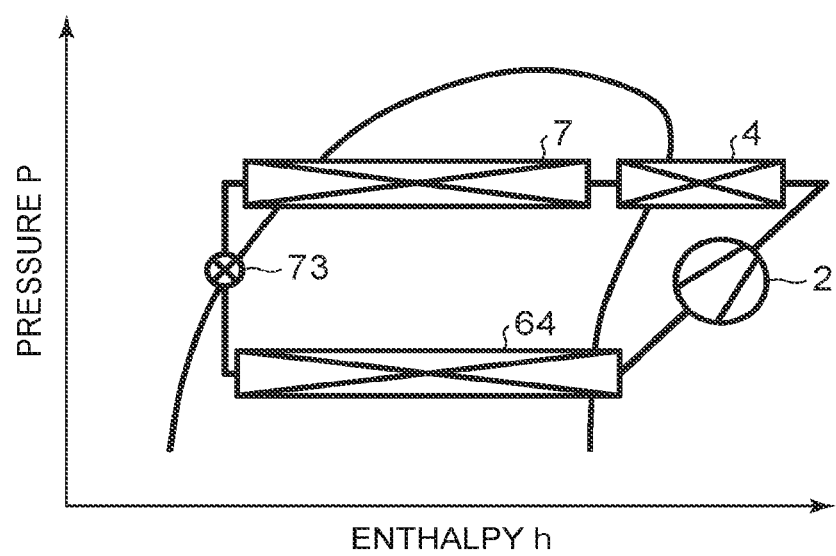
FIG. 22 is a p-h diagram of the second heating/battery cooling mode of FIG. 21.

Here, when due to execution of rapid charging of the battery 55, etc., the amount of heat generation of the battery 55 becomes extremely large, and the required battery cooling capability Qbat becomes extremely larger than the required heating capability Qtgt (Qtgt<<Qbat), the controller 32 further opens the solenoid valve 20 in the state of the second heating/battery cooling mode in FIGS. 19 and 20. FIG. 21 shows the flow (solid line arrows) of the refrigerant of the refrigerant circuit R in the second heating/battery cooling mode in this case, and the flow (broken line arrows) of the heat medium of the battery temperature adjustment device 61. FIG. 22 shows a p-h diagram of the refrigerant circuit R in the second heating/battery cooling mode in this case (in FIG. 22, each constituent device of the refrigerant circuit R is shown on the p-h diagram).

With the solenoid valve 20 of the refrigerant circuit R being opened in addition to the states of FIGS. 19 and 20 as described above, the refrigerant radiated in the radiator 4 flows out from the radiator 4 and flows into the outdoor heat exchanger 7 as it is, followed by being radiated into the outdoor air (the refrigerant is indicated by the solid line arrows in FIG. 21). Consequently, a great amount of excessive heat can be discharged into the outdoor air while heating the vehicle interior by using a great amount of heat generated in the battery 55. Even in this case, the controller 32 controls the operation of the compressor 2 (the number of revolutions NC) on the basis of the battery temperature Tb detected by the battery temperature sensor 76 and the target battery temperature TBO to thereby adjust the cooling capability of the battery 55 by the battery temperature adjustment device 61.

Further, the controller 32 controls passing of the refrigerant through the outdoor heat exchanger 7 by the number of revolutions of the outdoor blower 15 and opening/closing of the shutter 23 to adjust the heating capability of the vehicle interior. When, however, the heating capability in the radiator 4 becomes excessive even with the number of revolutions of the outdoor blower 15 as the maximum (a situation in which the amount of heat generation of the battery 55 is extremely large), the controller 32 controls the air mix damper 28 to control a ratio at which the air is to be passed through the radiator 4, for example, in its decreasing direction, thereby adjusting the heating capability of the vehicle interior.

As described above, the controller 32 has executed the first heating/battery cooling mode to let the refrigerant discharged from the compressor 2 radiate heat in the radiator 4, decompress the refrigerant from which the heat has been radiated, and then let the refrigerant absorb heat in the outdoor heat exchanger 7 and the refrigerant-heat medium heat exchanger 64, and the second heating/battery cooling mode to let the refrigerant discharged from the compressor 2 radiate heat in the radiator 4 and the outdoor heat exchanger 7, decompress the refrigerant from which the heat has been radiated, and then let the refrigerant absorb heat in the refrigerant-heat medium heat exchanger 64. Thus, when the amount of heat generation of the battery 55 is small, the controller executes the first heating/battery cooling mode, thereby making it possible to absorb the heat from the outdoor air in the outdoor heat exchanger 7, further pump up the heat of the battery 55, and heat the vehicle interior while cooling the battery 55. Further, when the amount of heat generation of the battery 55 is large at the rapid charging or the like, the controller executes the second heating/battery cooling mode, thereby making it possible to release the heat of the battery 55 into the outdoor air by the outdoor heat exchanger 7, and heat the vehicle interior while cooling the battery 55.

Thus, since it is possible to change the heat absorption and radiation of the refrigerant in the outdoor heat exchanger 7 when the heating of the vehicle interior is performed, the heat of the battery 55 is effectively utilized to efficiently perform the heating of the vehicle interior, and the cooling of the battery 55 can be appropriately performed while suppressing frosting to the outdoor heat exchanger 7.

Further, the controller 32 executes the third heating/battery cooling mode to obstruct the inflow of the refrigerant into the outdoor heat exchanger 7, let the refrigerant discharged from the compressor 2 radiate heat in the radiator 4, decompress the refrigerant from which the heat has been radiated, and then let the refrigerant absorb heat only in the refrigerant-heat medium heat exchanger 64. Therefore, when the amount of heat required to heat the vehicle interior (the heating load) and the amount of heat generation of the battery (the battery cooling load) become almost equal to each other, the controller executes the third heating/battery cooling mode, thereby making it possible to heat the vehicle interior only by the heat pumped up from the battery 55. Consequently, it is possible to efficiently heat the vehicle interior and appropriately cool the battery 55 while eliminating the problem of frosting to the outdoor heat exchanger 7.

In this case, the controller 32 changes and executes the aforementioned respective heating/battery cooling modes on the basis of the required heating capability Qtgt required for the radiator 4 and the required battery cooling capability Qbat required for the battery temperature adjustment device 61, and thereby enables the heating of the vehicle interior and the cooling of the battery 55 to be made compatible appropriately.

Specifically, in the embodiment, the controller 32 executes the first heating/battery cooling mode when the required heating capability Qtgt is larger than the required battery cooling capability Qbat, executes the third heating/battery cooling mode when the required heating capability Qtgt and the required battery cooling capability Qbat are equal to each other or values approximate to each other, and executes the second heating/battery cooling mode when the required battery cooling capability Qbat is larger than the required heating capability Qtgt. Therefore, the controller appropriately changes the respective heating/battery cooling modes, thereby making it possible to smoothly perform the efficient heating of the vehicle interior and the effective cooling of the battery 55.

Further, in the first heating/battery cooling mode, the controller 32 heats the heat medium by the heat medium heating heater 66 when it is not possible to achieve the required heating capability Qtgt by the heating capability Qhp generable by the radiator 4, and hence, the amount of heat generation of the battery 55 is small. When the heating capability of the vehicle interior by the radiator 4 runs short in the first heating/battery cooling mode, the controller heats the heat medium by the heat medium heating heater 66 of the battery temperature adjustment device 61 and pumps up the heat from the refrigerant, thereby enabling its shortage to be complemented.

Additionally, in the embodiment, in the second heating/battery cooling mode, the controller 32 controls the operation (the number of revolutions NC) of the compressor 2 to adjust the cooling capability of the battery 55 by the battery temperature adjustment device 61, and controls the circulation of the refrigerant in the radiator 4 and the outdoor heat exchanger 7 or the passing of the same through the radiator 4 and the outdoor heat exchanger 7 to thereby adjust the heating capability of the vehicle interior by the radiator 4. Therefore, when the amount of heat generation of the battery 55 is large, the cooling capability of the battery 55 is adjusted by the control of the compressor 2 in the second heating/battery cooling mode to effectively cool the battery 55, and the heating by the radiator 4 can be appropriately adjusted by controlling the circulation and passing of the refrigerant in and through the radiator 4 and the outdoor heat exchanger 7.

A means to control the circulation of the refrigerant in the radiator 4 by the controller 32 in this case is the outdoor expansion valve 6 to decompress the refrigerant flowing into the outdoor heat exchanger 7 in the embodiment. A means to control the circulation of the refrigerant in the outdoor heat exchanger 7 by the controller 32 is the auxiliary expansion valve 73 to decompress the refrigerant flowing into the refrigerant-heat medium heat exchanger 64. Further, a means to control the passing of the refrigerant through the radiator 4 by the controller 32 is the air mix damper 28 to adjust the ratio at which the air in the air flow passage 3 is to be passed through the radiator 4, in the embodiment. A means to control the passing of the refrigerant through the outdoor heat exchanger 7 by the controller 32 is the shutter 23 to obstruct the inflow of the running air into the outdoor blower 15 and the outdoor heat exchanger 7 to pass the outdoor air through the outdoor heat exchanger 7 in the embodiment.

Then, in the embodiment, the refrigerant circuit R is provided with the outdoor expansion valve 6 to decompress the refrigerant flowing out from the radiator 4 and flowing into the outdoor heat exchanger 7, the heat absorber 9 to let the refrigerant flowing out from the outdoor heat exchanger 7 absorb heat, thereby cooling the air to be supplied from the air flow passage 3 to the vehicle interior, the solenoid valve 17 and the indoor expansion valve 8 (the valve device) to control the inflow of the refrigerant into the heat absorber 9, the refrigerant pipe 13D (the first bypass circuit) to absorb the refrigerant flowing out from the outdoor heat exchanger 7 in the compressor 2 without allowing the refrigerant to flow in the solenoid valve 17, the solenoid valve 21 (the first opening/closing valve) disposed in the refrigerant pipe 13D, the refrigerant pipe 13F (the second bypass circuit) to distribute the refrigerant flowing out from the radiator 4 from the refrigerant upstream side of the outdoor expansion valve 6 to allow the refrigerant to flow to the refrigerant upstream side of the solenoid valve 17, the solenoid valve 22 (the second opening/closing valve) disposed in the refrigerant pipe 13F, the branch pipe 72 (the branch circuit) to let the refrigerant flowing out from the refrigerant pipe 13F flow through the refrigerant-heat medium heat exchanger 64, the auxiliary expansion valve 73 disposed in the branch pipe 72 to decompress the refrigerant flowing into the refrigerant-heat medium heat exchanger 64, and the check valve 18 to obstruct the inflow of the refrigerant flowing out from the refrigerant pipe 13F into the outdoor heat exchanger 7. The controller 32 controls the outdoor expansion valve 6, the solenoid valve 17, the solenoid valve 21, the solenoid valve 22, the auxiliary expansion valve 73, and the circulating pump 62 of the battery temperature adjustment device 61, and changes and executes the first heating/battery cooling mode, the second heating/battery cooling mode, and the third heating/battery cooling mode. Therefore, the controller is capable of executing the first heating/battery cooling mode by opening the solenoid valves 21 and 22 and closing the solenoid valve 17 to decompress the refrigerant flowing into the outdoor heat exchanger 7 and the refrigerant-heat medium heat exchanger 64 by the outdoor expansion valve 6 and the auxiliary expansion valve 73, executing the third heating/battery cooling mode by opening the solenoid valve 22, fully closing the outdoor expansion valve 6, and closing the solenoid valve 21 and the solenoid valve 17 to decompress the refrigerant flowing into the refrigerant-heat medium heat exchanger 64 by the auxiliary expansion valve 73, and executing the second heating/battery cooling mode by opening the outdoor expansion valve 6 and closing the solenoid valve 21, the solenoid valve 22, and the solenoid valve 17 to decompress the refrigerant flowing into the refrigerant-heat medium heat exchanger 64 by the auxiliary expansion valve 73.

Incidentally, in the embodiment, the inflow of the refrigerant into the heat absorber 9 is controlled by the solenoid valve 17 and the indoor expansion valve 8, but if the indoor expansion valve 8 is constituted of a fully-closable electric valve, it is also possible to delete the solenoid valve 17 and achieve its role by the indoor expansion valve 8 alone. That is, in that case, the operation of closing the solenoid valve 17 becomes equivalent to the operation of fully closing the valve position of the indoor expansion valve 8 in the embodiment of the present application.

(8-4) Defrosting/Heating/Battery Cooling Mode

Figure 23:
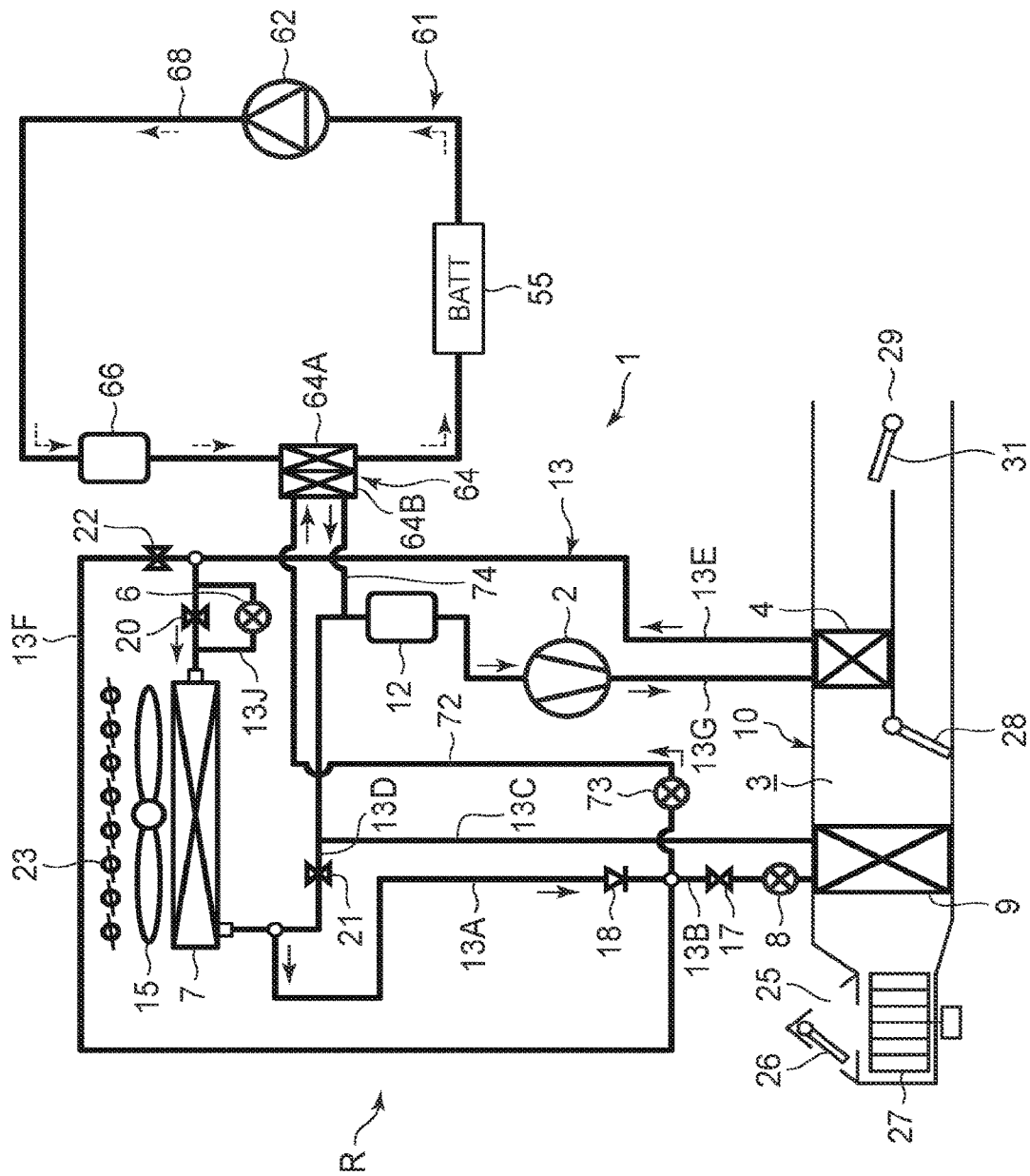
FIG. 23 is another diagram describing a defrosting/heating/battery cooling mode by the controller of FIG. 2.
Figure 24:
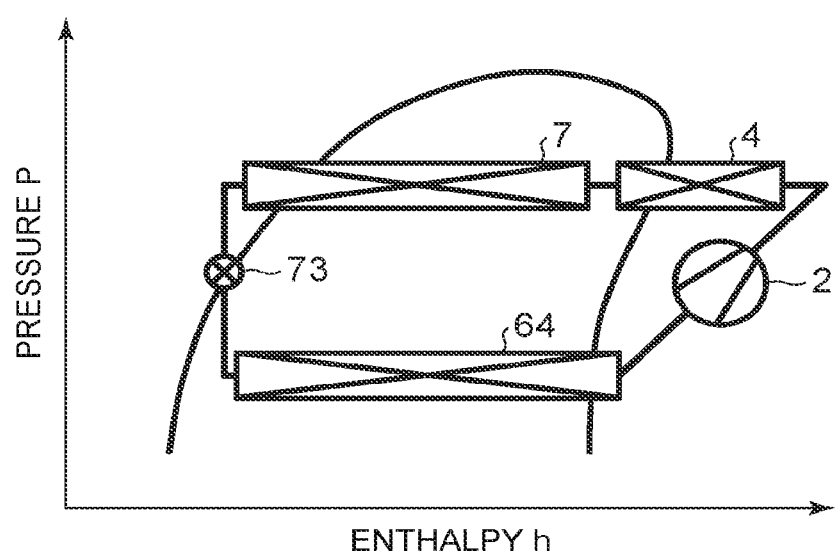
FIG. 24 is a p-h diagram of the defrosting/heating/battery cooling mode of FIG. 23.

Next, description will be made as to the defrosting/heating/battery cooling mode by the controller 32. Since the outdoor heat exchanger 7 functions as the evaporator as described above during the heating operation, the water in the outdoor air grows into frost in the outdoor heat exchanger 7, and heat exchange efficiency is deteriorated. The controller 32 calculates an outdoor heat exchanger temperature TXObase at the time of non-frosting which is calculated from, for example, the outdoor air temperature Tam, the number of revolutions NC of the compressor 2, etc., and always compares the outdoor heat exchanger temperature TXObase and the outdoor heat exchanger temperature TXO detected by the outdoor heat exchanger temperature sensor 54. Then, when the outdoor heat exchanger temperature TXO is lowered than the outdoor heat exchanger temperature TXObase at the time of non-frosting, and the difference therebetween becomes a predetermined value or more, the controller executes the defrosting/heating/battery cooling mode to perform the heating of the vehicle interior and the cooling of the battery 55 while defrosting the outdoor heat exchanger 7 when the required battery cooling capability Qbat calculated in the aforementioned equation (IV) becomes plus (FIG. 23 and FIG. 24).

In the defrosting/heating/battery cooling mode, the shutter 23 is closed in the state of the refrigerant circuit R in the aforementioned second heating/battery cooling mode of FIG. 21 to obstruct the inflow of the running air into the outdoor heat exchanger 7. Further, the outdoor blower 15 is stopped, and the compressor 2 and the indoor blower 27 are operated. Then, the circulating pump 62 of the battery temperature adjustment device 61 is also operated, and the heat is exchanged between the refrigerant and the heat medium in the refrigerant-heat medium heat exchanger 64. Incidentally, when the shutter 23 is provided as in the embodiment, the shutter 23 is closed, but when the shutter 23 is not provided, the outdoor blower 15 is stopped and the forced ventilation of the outdoor air is only stopped. FIG. 23 shows the flow (solid line arrows) of the refrigerant of the refrigerant circuit R in the defrosting/heating/battery cooling mode, and the flow (broken line arrows) of the heat medium of the battery temperature adjustment device 61. FIG. 24 shows a p-h diagram of the refrigerant circuit R in the defrosting/heating/battery cooling mode (each constituent device of the refrigerant circuit R is shown on the p-h diagram in FIG. 24).

Thus, the high-temperature refrigerant discharged from the compressor 2 flows into the radiator 4 and radiates heat, and heats the air to be passed into the air flow passage 3, and then flows through the solenoid valve 20 into the outdoor heat exchanger 7. Since the outdoor air and the running air do not pass through the outdoor heat exchanger 7, the formed frost grown in the outdoor heat exchanger 7 is heated by the flowing high-temperature refrigerant to melt. On the other hand, the refrigerant is condensed in the outdoor heat exchanger 7 and flows out from the outdoor heat exchanger 7 into the branch pipe 72 in the same manner as described above. After the refrigerant is decompressed in the auxiliary expansion valve 73, it evaporates in the refrigerant flow passage 64B of the refrigerant-heat medium heat exchanger 64.

The refrigerant absorbs heat from the heat medium circulated in the battery temperature adjustment device 61 here, and hence, cools the battery 55 as its result, so that the vehicle interior is heated by the heat pumped up from the heat medium while defrosting the outdoor heat exchanger 7. Incidentally, when it is desired to quickly defrost the outdoor heat exchanger 7, the controller 32 may allow the heat medium heating heater 66 to generate heat. In that case, the heat of the heat medium heating heater 66 is also pumped up by the refrigerant, and transferred to the outdoor heat exchanger 7 to contribute to defrosting.

Thus, the controller 32 executes, in the state of the outdoor air not passing through the outdoor heat exchanger 7 or the state of obstructing the inflow of the running air, the defrosting/heating/battery cooling mode to let the refrigerant discharged from the compressor 2 radiate heat in the radiator 4 and the outdoor heat exchanger 7, decompress the so-radiated refrigerant in the auxiliary expansion valve 73, and then let the refrigerant absorb heat in the refrigerant-heat medium heat exchanger 64. It is therefore possible to pump up the heat of the battery 55 and thereby heat the vehicle interior while defrosting the outdoor heat exchanger 7 by the high-temperature refrigerant discharged from the compressor 2.

(8-5) Cooling/Battery Cooling Mode

Figure 25:
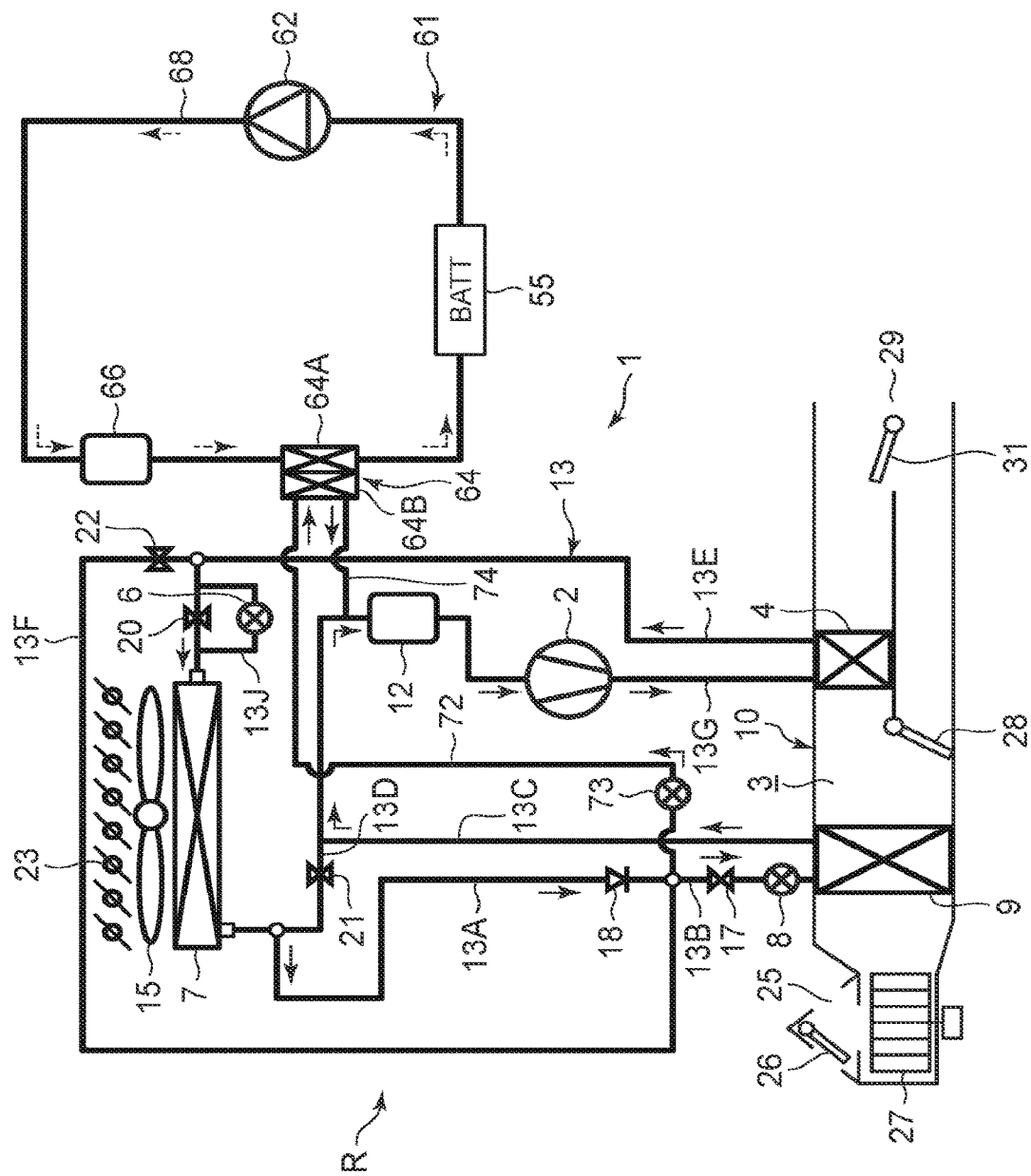
FIG. 25 is a diagram describing a cooling/battery cooling mode by the controller of FIG. 2.
Figure 26:
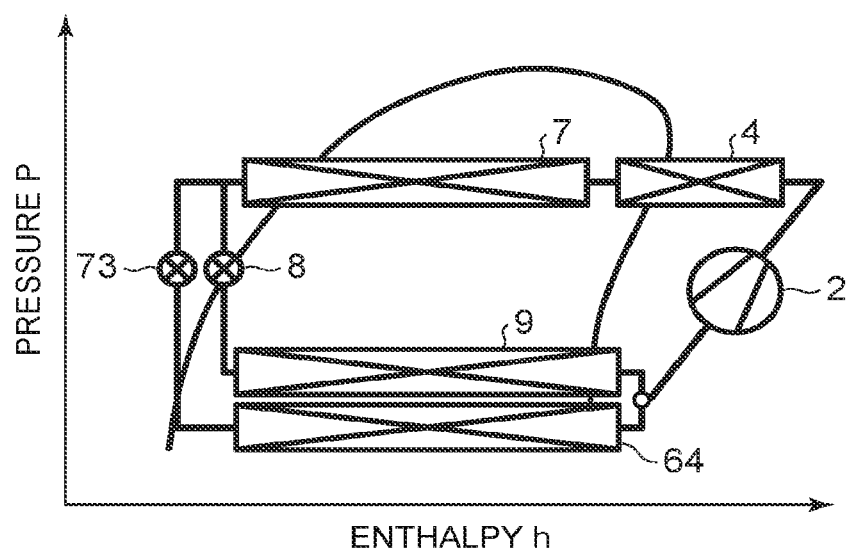
FIG. 26 is a p-h diagram of the cooling/battery cooling mode of FIG. 25.

Next, when the battery temperature Tb rises due to the charging/discharging or the like and becomes higher than the target battery temperature TBO during the aforementioned cooling operation (TBO<Tb), in the embodiment, the controller 32 opens the auxiliary expansion valve 73 and operates the battery temperature adjustment device 61 to start the cooling of the battery 55, thereby executing the cooling/battery cooling mode (FIGS. 25 and 26).

In the cooling/battery cooling mode, the controller 32 has a state of in the state of the refrigerant circuit R in the aforementioned cooling operation of FIG. 11, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. Incidentally, the heat medium heating heater 66 is not energized. FIG. 25 shows the flow (solid line arrows) of the refrigerant of the refrigerant circuit R in the cooling/battery cooling mode, and the flow (broken line arrows) of the heat medium of the battery temperature adjustment device 61. FIG. 26 shows a p-h diagram of the refrigerant circuit R in the cooling/battery cooling mode (in FIG. 26, each constituent device of the refrigerant circuit R is shown on the p-h diagram).

Thus, the high-temperature refrigerant discharged from the compressor 2 flows through the radiator 4 and the solenoid valve 20 successively into the outdoor heat exchanger 7, where the refrigerant exchanges the heat between the outdoor air to be passed by the outdoor blower 15 and the running air to radiate heat, to condense. A part of the refrigerant condensed in the outdoor heat exchanger 7 reaches the indoor expansion valve 8 and is decompressed therein, and then flows into the heat absorber 9 to evaporate. The air in the air flow passage 3 is cooled by a heat absorbing operation at this time, and hence the vehicle interior is cooled.

The residual refrigerant condensed in the outdoor heat exchanger 7 is distributed to the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

(8-6) Dehumidification Cooling/Battery Cooling Mode

Figure 27:
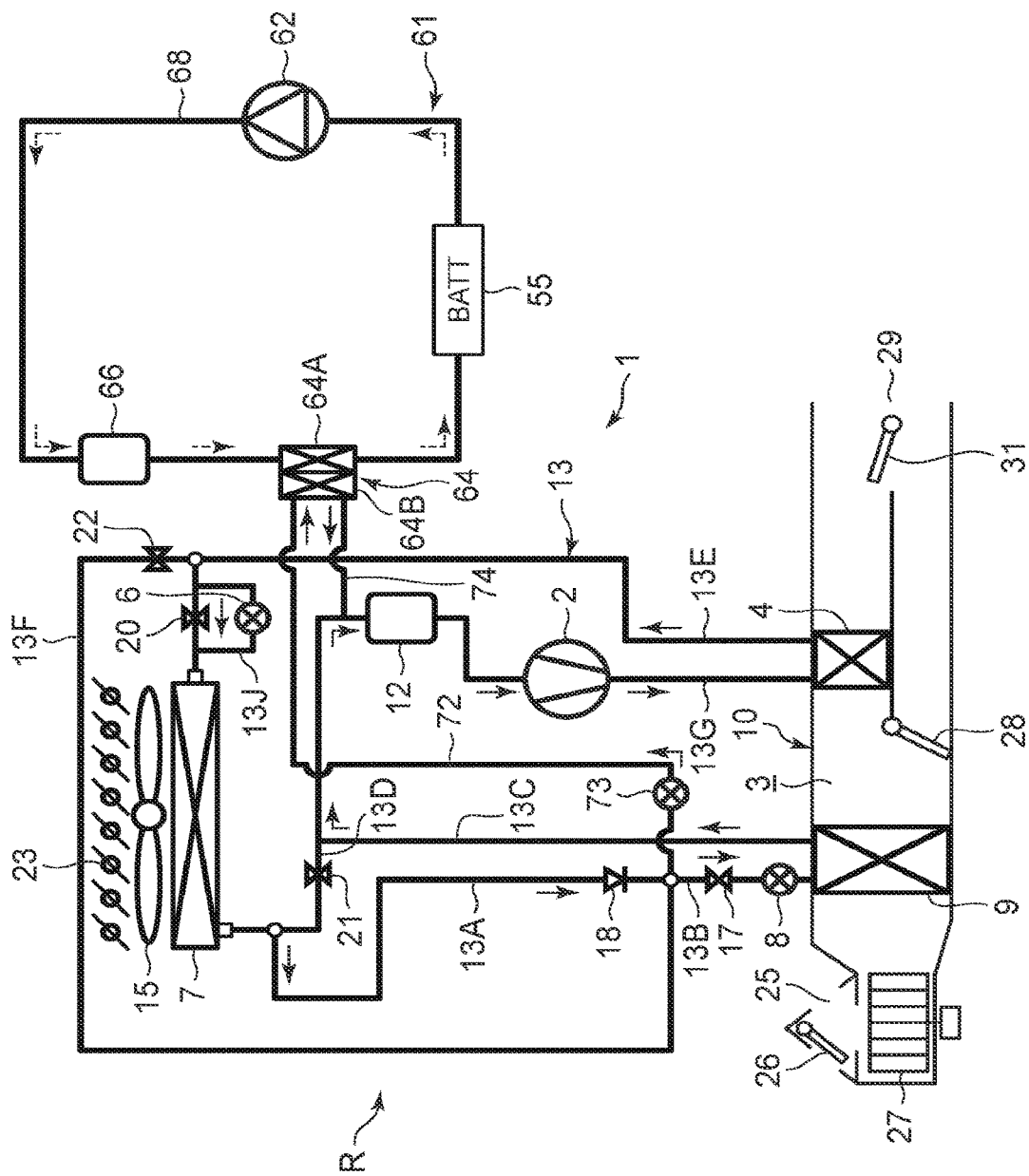
FIG. 27 is a diagram describing a dehumidification cooling/battery cooling mode by the controller of FIG. 2.
Figure 28:
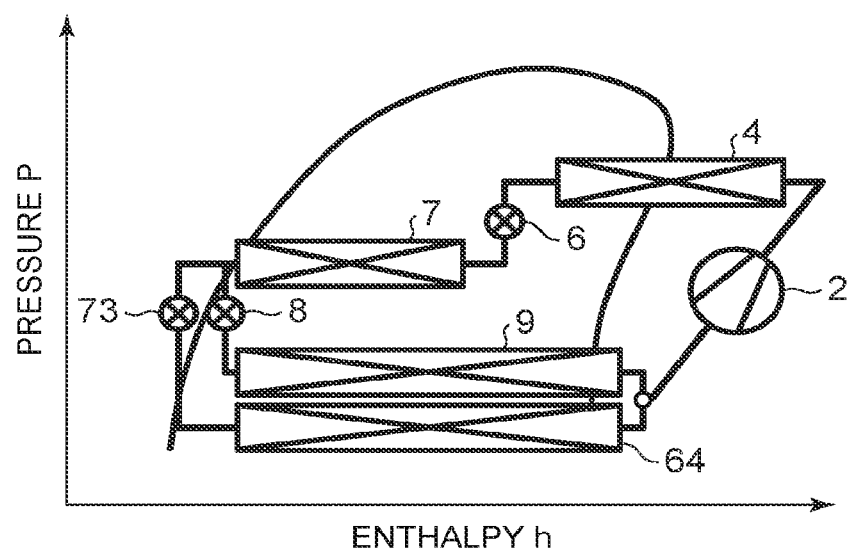
FIG. 28 is a p-h diagram of the dehumidification cooling/battery cooling mode of FIG. 27.

Next, when the battery temperature Tb rises due to the charging/discharging or the like and becomes higher than the target battery temperature TBO during the aforementioned dehumidifying and cooling operation (TBO<Tb), in the embodiment, the controller 32 opens the auxiliary expansion valve 73 and operates the battery temperature adjustment device 61 to start the cooling of the battery 55, thereby executing the dehumidification cooling/battery cooling mode (FIGS. 27 and 28).

In the dehumidification cooling/battery cooling mode, the controller 32 has a state of in the state of the refrigerant circuit R in the aforementioned dehumidifying and cooling operation of FIG. 9, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. Incidentally, the heat medium heating heater 66 is not energized. FIG. 27 shows the flow (solid line arrows) of the refrigerant of the refrigerant circuit R in the dehumidification cooling/battery cooling mode, and the flow (broken line arrows) of the heat medium of the battery temperature adjustment device 61. FIG. 28 shows a p-h diagram of the refrigerant circuit R in the dehumidification cooling/battery cooling mode (in FIG. 28, each constituent device of the refrigerant circuit R is shown on the p-h diagram).

Thus, the high-temperature high-pressure gas refrigerant discharged from the compressor 2 flows into the radiator 4. Since the air in the air flow passage 3 is passed through the radiator 4, the air in the air flow passage 3 is heated by the high-temperature refrigerant in the radiator 4. On the other hand, the refrigerant in the radiator 4 has the heat taken by the air and is cooled to condense and liquefy. The refrigerant flowing out from the radiator 4 reaches the outdoor expansion valve 6 and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. A part of the refrigerant flowing out from the outdoor heat exchanger 7 reaches the indoor expansion valve 8 and is decompressed therein, and then flows into the heat absorber 9 to evaporate. The air to be supplied from the air flow passage 3 to the vehicle interior is cooled and dehumidified by a heat absorbing operation at this time and hence, the vehicle interior is dehumidified and cooled.

The residual refrigerant condensed in the outdoor heat exchanger 7 is distributed to the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

Figure 29:
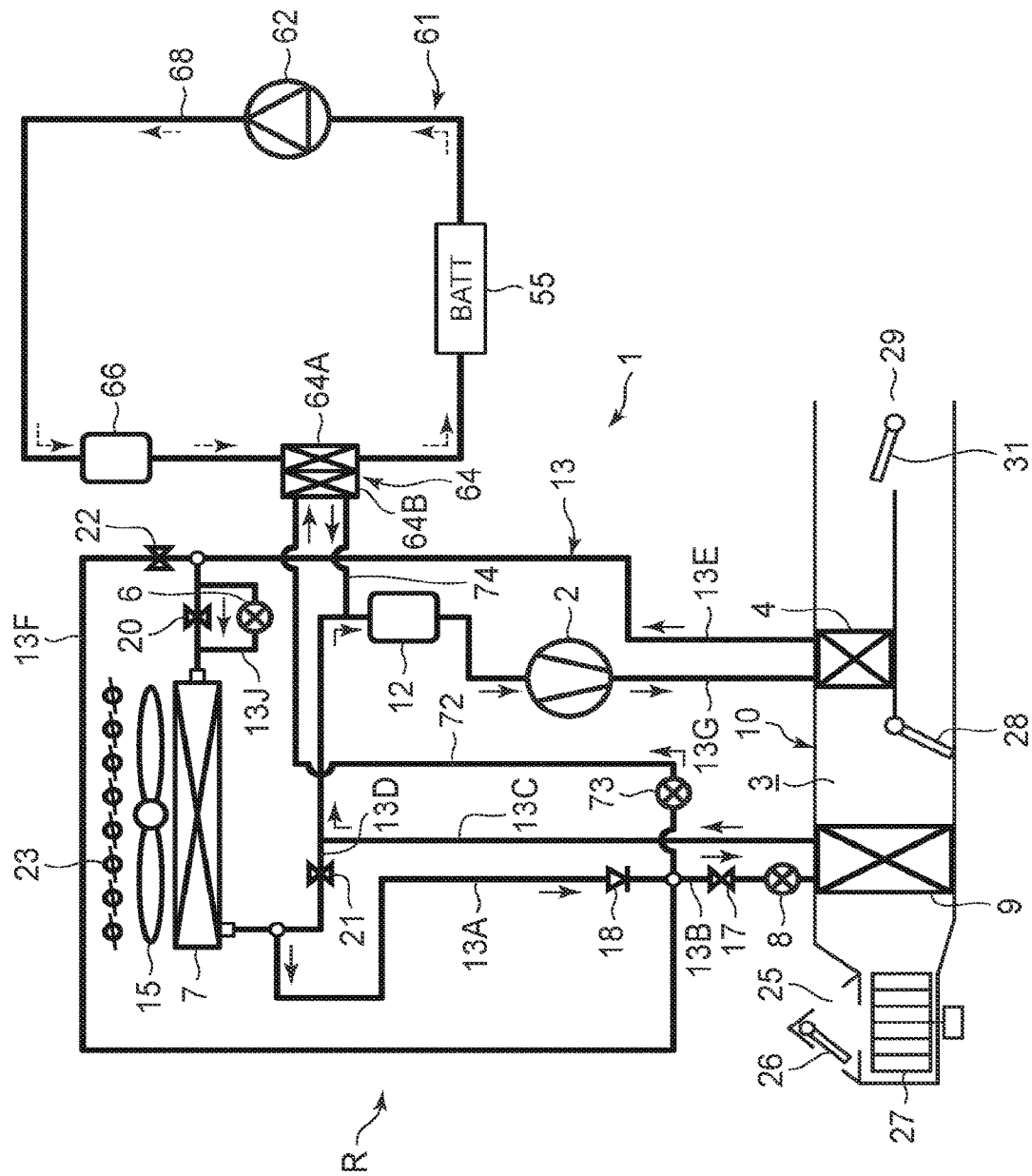
FIG. 29 is a diagram describing a dehumidification cooling/battery cooling mode (shutter being closed) by the controller of FIG. 2.

Incidentally, as shown in FIG. 13 mentioned above, the cooling of the battery 55 can be performed even in the state in which in the dehumidifying and cooling operation, the shutter 23 is closed, and the outdoor blower 15 is also stopped. The flow of the refrigerant and the state of the shutter 23 in the dehumidification cooling/battery cooling mode (the shutter being closed) are shown in FIG. 29, and a p-h diagram of the refrigerant circuit R is shown in FIG. 30 (in FIG. 30, each constituent device of the refrigerant circuit R is shown on the p-h diagram).

Figure 30:
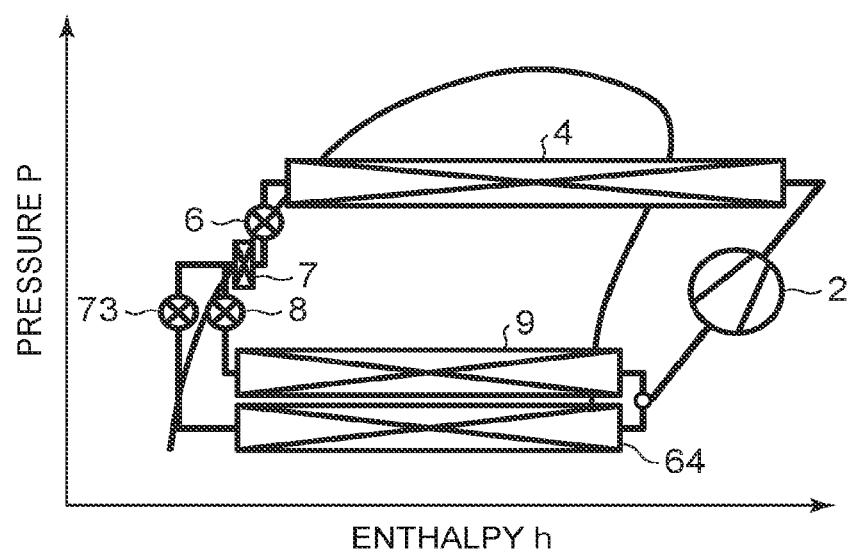
FIG. 30 is a p-h diagram of the dehumidification cooling/battery cooling mode of FIG. 29.

That is, even in this case, the running air does not flow into the outdoor heat exchanger 7, and the ventilation of the outdoor air is eliminated as well, and hence the amount of heat exchange between the refrigerant and the outdoor air in the outdoor heat exchanger 7 becomes extremely small as shown in the p-h diagram of FIG. 30. Since the amount of radiation of the refrigerant in the radiator 4 increases correspondingly, the valve position of the outdoor expansion valve 6 is greatly reduced, or the radiator pressure PCI can be set to the target radiator pressure PCO even without taking the minimum valve position, thereby making it possible to prevent even the temperature spot which occurs in the heat absorber 9.

The refrigerant flowing out from the outdoor heat exchanger 7 is distributed to the refrigerant directed from the indoor expansion valve 8 to the heat absorber 9 and the refrigerant directed to the branch pipe 72 in the same manner as in FIG. 27. The refrigerant flowing into the branch pipe 72 is decompressed in the auxiliary expansion valve 73, and then evaporates in the refrigerant flow passage 64B of the refrigerant-heat medium heat exchanger 64. Here, the refrigerant absorbs heat from the heat medium circulated in the battery temperature adjustment device 61, and hence, the battery 55 is cooled in the same manner as the above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

(8-7) Internal Cycle/Battery Cooling Mode

Figure 31:
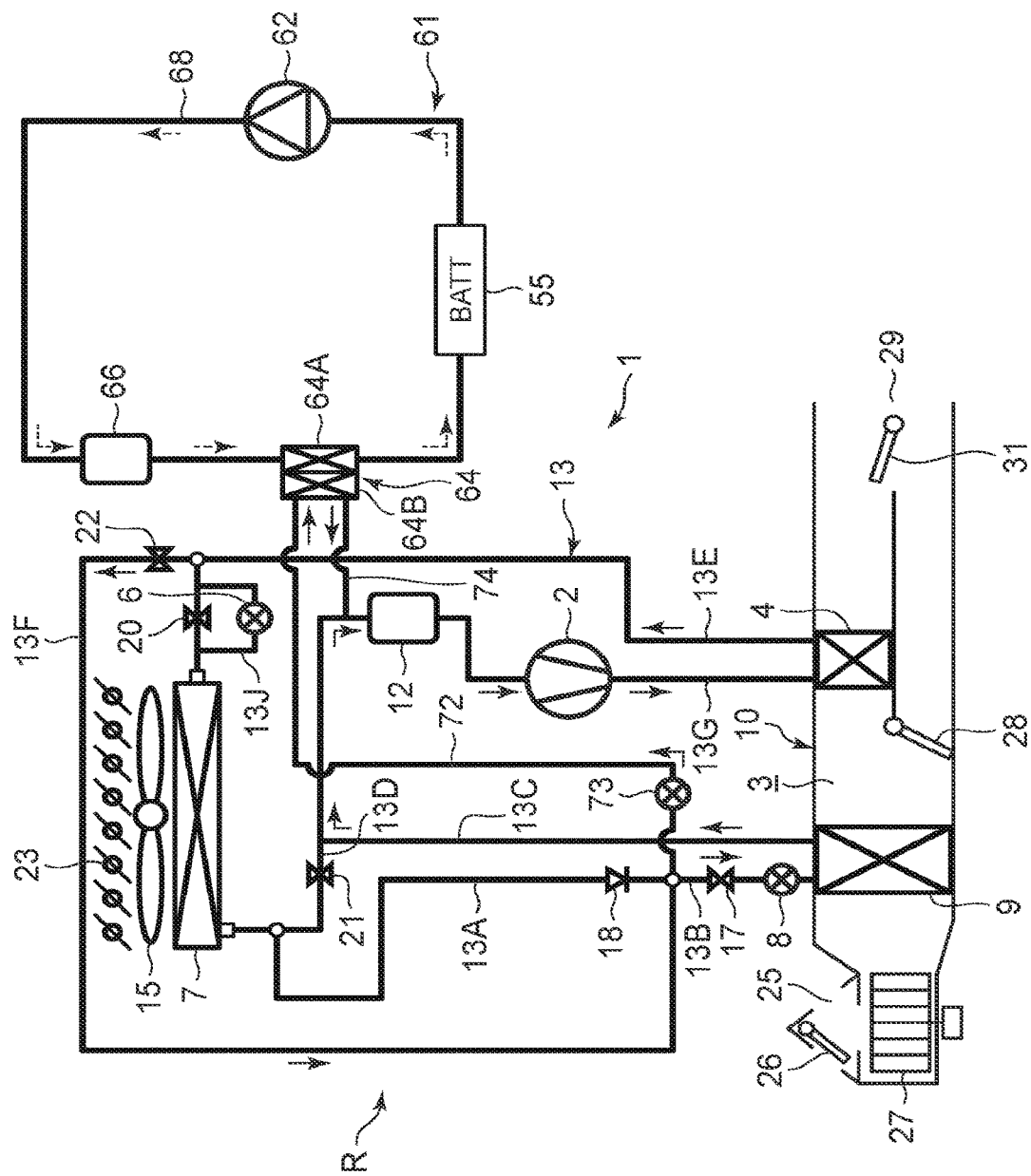
FIG. 31 is a diagram describing an internal cycle/battery cooling mode by the controller of FIG. 2.
Figure 32:
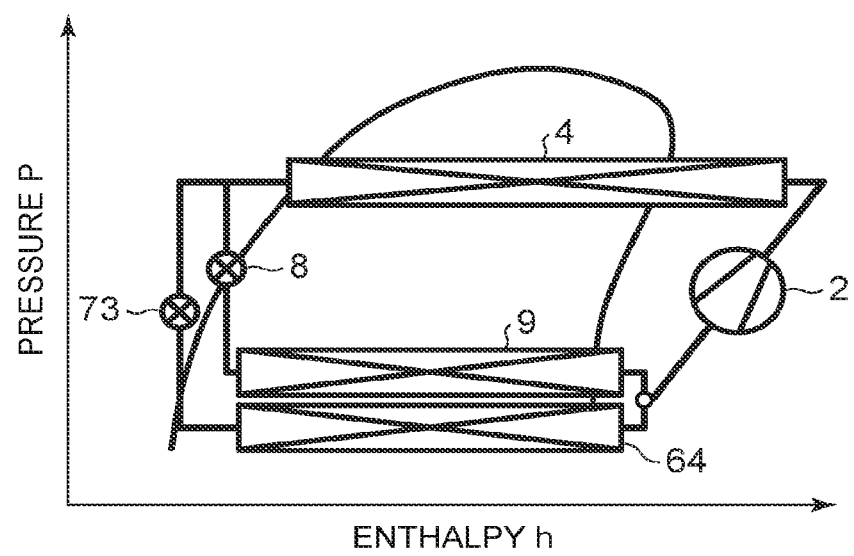
FIG. 32 is a p-h diagram of the internal cycle/battery cooling mode of FIG. 31.

Next, when the battery temperature Tb rises due to the charging/discharging or the like and becomes higher than the target battery temperature TBO during the aforementioned internal cycle operation (TBO<Tb), in the embodiment, the controller 32 opens the auxiliary expansion valve 73 and operates the battery temperature adjustment device 61 to start the cooling of the battery 55, thereby executing the internal cycle/battery cooling mode (FIGS. 31 and 32).

In the internal cycle/battery cooling mode, the controller 32 has a state of in the state of the refrigerant circuit R in the aforementioned internal cycle operation of FIG. 7, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. Incidentally, the heat medium heating heater 66 is not energized. FIG. 31 shows the flow (solid line arrows) of the refrigerant of the refrigerant circuit R in this internal cycle/battery cooling mode, and the flow (broken line arrows) of the heat medium of the battery temperature adjustment device 61. FIG. 32 shows a p-h diagram of the refrigerant circuit R in the internal cycle/battery cooling mode (in FIG. 32, each constituent device of the refrigerant circuit R is shown on the p-h diagram).

Consequently, the high-temperature refrigerant discharged from the compressor 2 radiates heat in the radiator 4, and then, all the refrigerant flows through the solenoid valve 22 into the refrigerant pipe 13F. Then, a part of the refrigerant flowing out from the refrigerant pipe 13F reaches from the refrigerant pipe 13B to the indoor expansion valve 8 through the solenoid valve 17, and is decompressed therein, and then flows into the heat absorber 9 to evaporate. The water in the air blown out from the indoor blower 27 coagulates to adhere to the heat absorber 9 by the heat absorbing operation at this time, and hence, the air is cooled and dehumidified.

The residual refrigerant flowing out from the refrigerant pipe 13F is distributed to the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the refrigerant-heat medium heat exchanger 64 is also sucked from the refrigerant pipe 74 to the compressor 2 through the accumulator 12.

(8-8) Dehumidification Heating/Battery Cooling Mode

Figure 33:
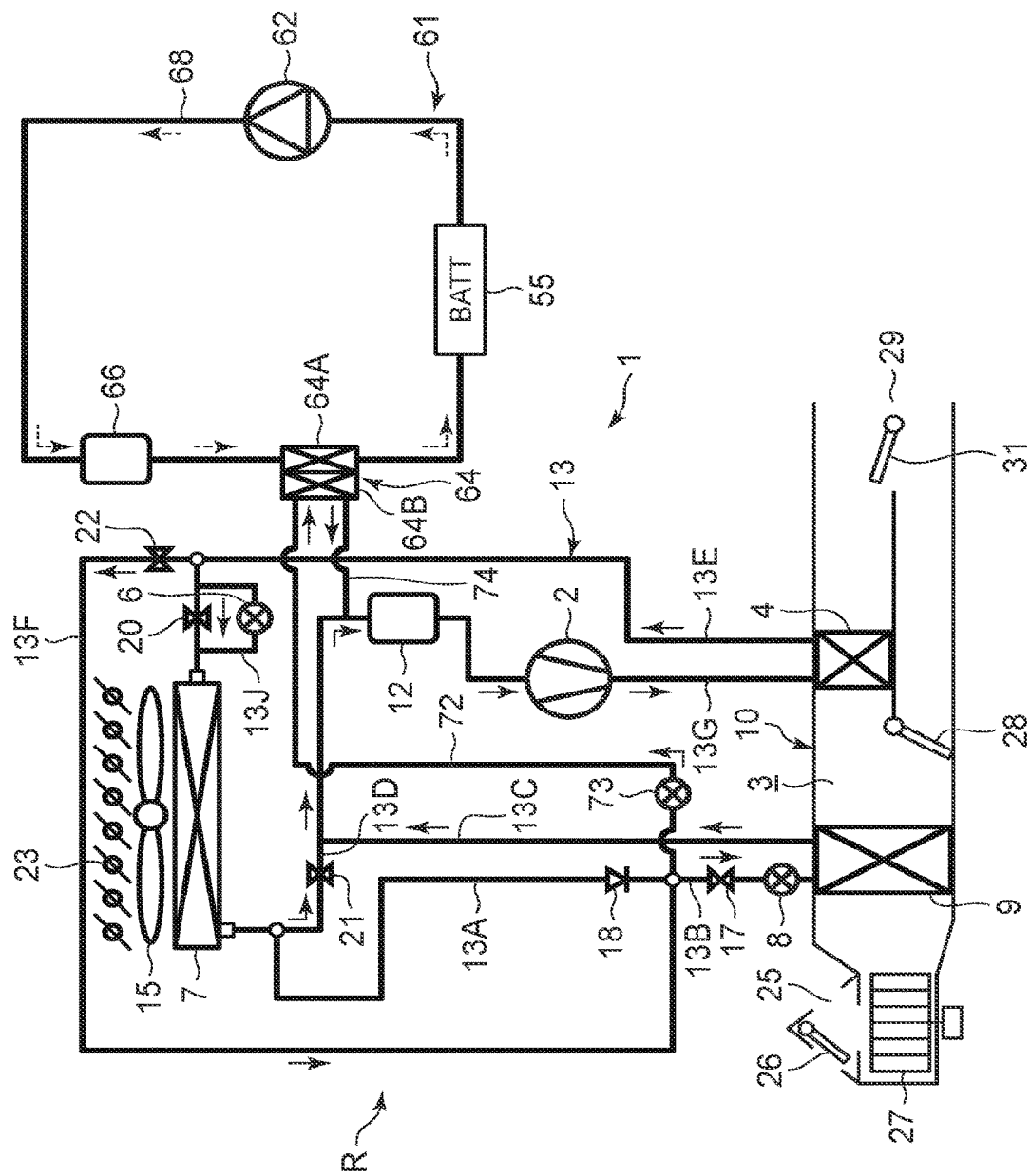
FIG. 33 is a diagram describing a dehumidification heating/battery cooling mode by the controller of FIG. 2.
Figure 34:
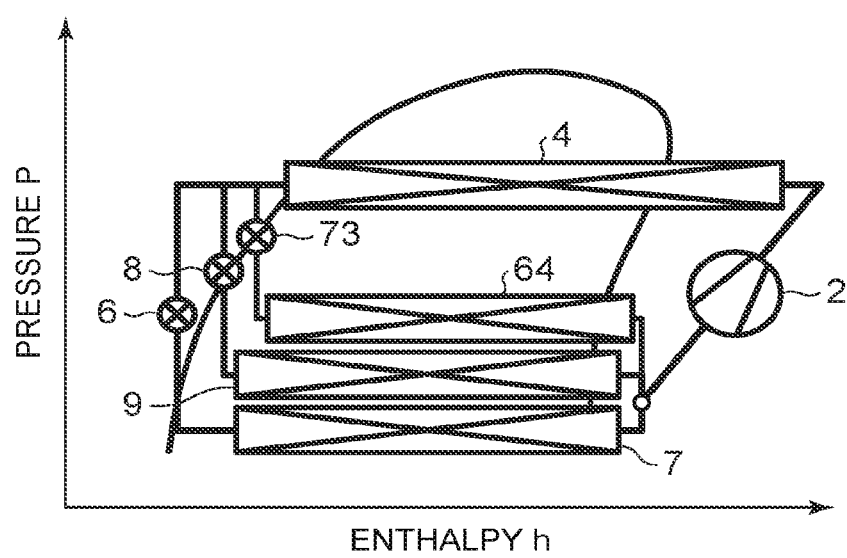
FIG. 34 is a p-h diagram of the dehumidification heating/battery cooling mode of FIG. 33.

Next, when the battery temperature Tb rises due to the charging/discharging or the like and becomes higher than the target battery temperature TBO during the aforementioned dehumidifying and heating operation (TBO<Tb), in the embodiment, the controller 32 opens the auxiliary expansion valve 73 and operates the battery temperature adjustment device 61 to start the cooling of the battery 55, thereby executing the dehumidification heating/battery cooling mode (FIGS. 33 and 34).

In the dehumidification heating/battery cooling mode, the controller 32 has a state of in the state of the refrigerant circuit R in the aforementioned dehumidifying and heating operation of FIG. 5, opening the auxiliary expansion valve 73 to control its valve position, and also operating the circulating pump 62 of the battery temperature adjustment device 61 to exchange the heat between the refrigerant and the heat medium in the refrigerant-heat medium heat exchanger 64. FIG. 33 shows the flow (solid line arrows) of the refrigerant of the refrigerant circuit R in this dehumidification heating/battery cooling mode, and the flow (broken line arrows) of the heat medium of the battery temperature adjustment device 61. FIG. 34 shows a p-h diagram of the refrigerant circuit R in the dehumidification heating/battery cooling mode (in FIG. 34, each constituent device of the refrigerant circuit R is shown on the p-h diagram).

Thus, a part of the condensed refrigerant flowing out from the radiator 4 is distributed, and the so-distributed refrigerant flows through the solenoid valve 22 into the refrigerant pipe 13F and flows out from the refrigerant pipe 13F. A part of the refrigerant flows from the refrigerant pipe 13B to the indoor expansion valve 8, and the residual refrigerant flows into the outdoor expansion valve 6. That is, the part of the distributed refrigerant is decompressed in the indoor expansion valve 8, and then flows into the heat absorber 9 to evaporate. The water in the air blown out from the indoor blower 27 coagulates to adhere to the heat absorber 9 by the heat absorbing operation of the refrigerant which occurs in the heat absorber 9 at this time. Hence, the air is cooled and dehumidified. The air dehumidified in the heat absorber 9 is reheated in the process of passing the radiator 4, whereby the dehumidifying and heating of the vehicle interior are performed. Further, the residual condensed refrigerant flowing out from the radiator 4 is decompressed in the outdoor expansion valve 6, and then evaporates in the outdoor heat exchanger 7 and absorbs heat from the outdoor air.

On the other hand, the residual refrigerant flowing out from the refrigerant pipe 13F flows into the branch pipe 72 and is decompressed in the auxiliary expansion valve 73, and then evaporates in the refrigerant flow passage 64B of the refrigerant-heat medium heat exchanger 64. Since the refrigerant absorbs heat from the heat medium circulated in the battery temperature adjustment device 61 here, the battery 55 is cooled in the same manner as described above. Incidentally, the refrigerant flowing out from the heat absorber 9 is sucked into the compressor 2 through the refrigerant pipe 13C and the accumulator 12. The refrigerant flowing out from the outdoor heat exchanger 7 is sucked into the compressor 2 through the refrigerant pipe 13D, the solenoid valve 21, the refrigerant pipe 13C, and the accumulator 12. The refrigerant flowing out from the refrigerant-heat medium heat exchanger 64 is also sucked from the refrigerant pipe 74 to the compressor 2 through the accumulator 12.

(8-9) Battery Cooling Single Mode

Figure 35:
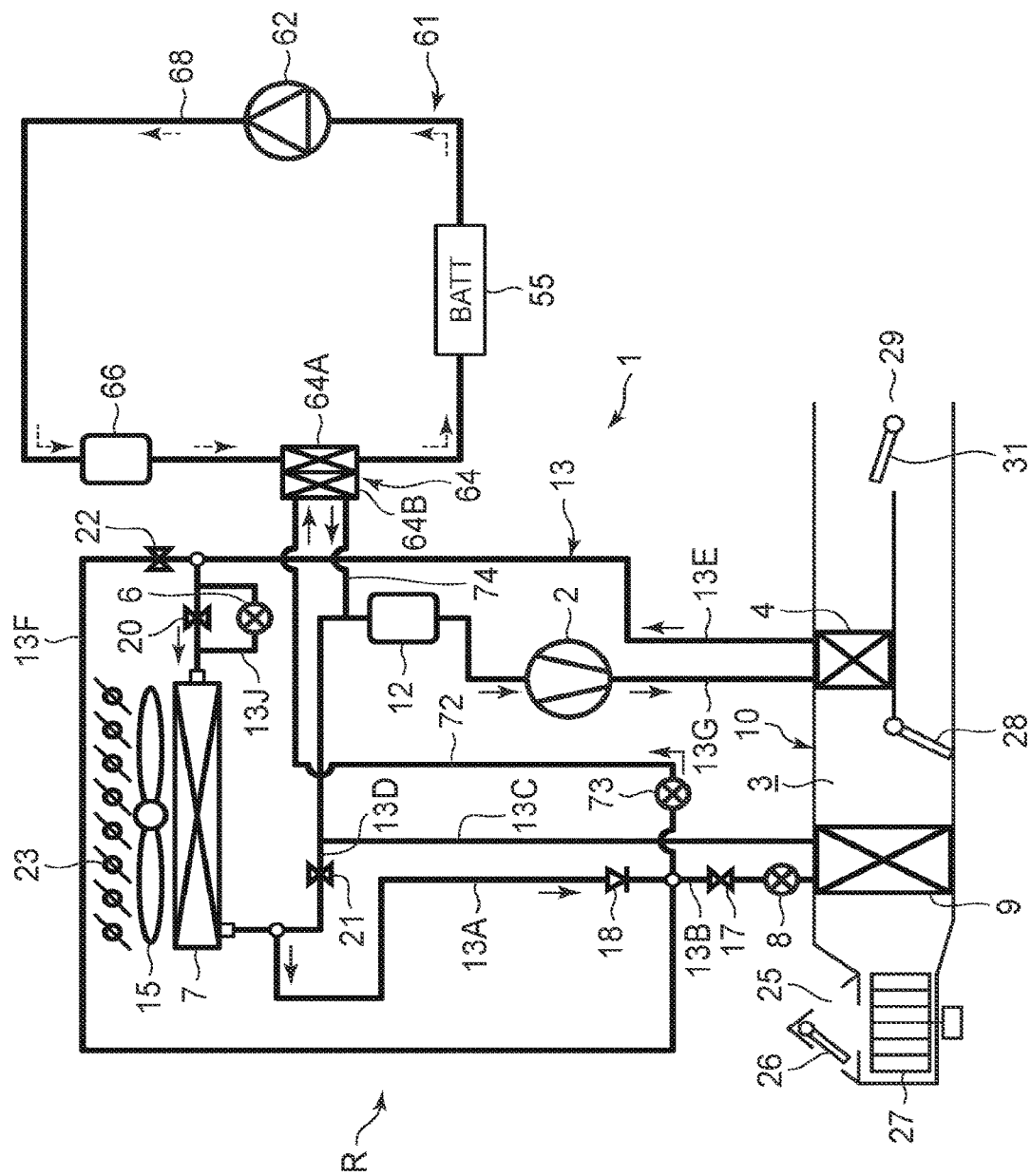
FIG. 35 is a diagram describing a battery cooling single mode by the controller of FIG. 2.
Figure 36:
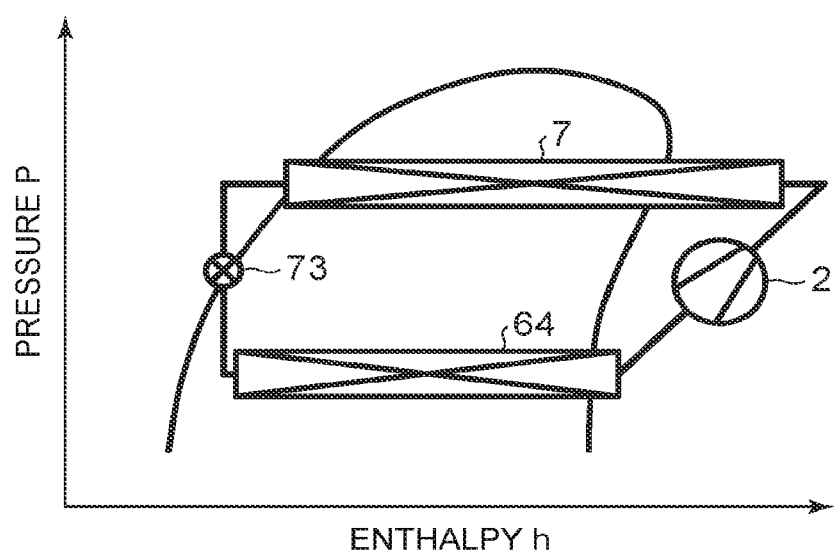
FIG. 36 is a p-h diagram of the battery cooling single mode of FIG. 35.

Next, when in the case such as when the vehicle is stopped and the battery 55 is charged, or the like, the battery temperature Tb rises due to its self-heat generation or the like and becomes higher than the target battery temperature TBO (TBO<Tb), in the embodiment, the controller 32 executes the battery cooling single mode (FIG. 35 and FIG. 36). Since there are no passengers in the vehicle interior in this battery cooling single mode, there is no need to air-condition the vehicle interior, but the controller 32 operates the compressor 2 and operates the outdoor blower 15 as well. Further, the controller opens the solenoid valve 20 and opens even the auxiliary expansion valve 73 to decompress the refrigerant.

Further, the controller 32 closes the solenoid valve 17, the solenoid valve 21, and the solenoid valve 22, and stops the indoor blower 27 as well. Then, the controller 32 has a state of operating the circulating pump 62 and exchanging the heat between the refrigerant and the heat medium in the refrigerant-heat medium heat exchanger 64. FIG. 35 shows the flow (solid line arrows) of the refrigerant of the refrigerant circuit R in this battery cooling single mode, and the flow (broken line arrows) of the heat medium of the battery temperature adjustment device 61. FIG. 36 shows a p-h diagram of the refrigerant circuit R in the battery cooling single mode (in FIG. 36, each constituent device of the refrigerant circuit R is shown on the p-h diagram).

Consequently, the high-temperature high-pressure gas refrigerant discharged from the compressor 2 reaches from the refrigerant pipe 13E to the outdoor expansion valve 6 through the radiator 4. Since the solenoid valve 20 is opened at this time, the refrigerant passes the refrigerant pipe 13J through the solenoid valve 20 and flows into the outdoor heat exchanger 7 as it is, and is cooled by the outdoor air passed through the outdoor blower 15 and then condensed and liquefied. When the formed frost is grown in the outdoor heat exchanger 7, the outdoor heat exchanger 7 is defrosted by the heat absorbing operation at this time.

Since the refrigerant flowing out from the outdoor heat exchanger 7 enters the refrigerant pipe 13A, but the solenoid valve 17 is closed at this time, all the refrigerant flowing out from the outdoor heat exchanger 7 flows through the branch pipe 72 to reach the auxiliary expansion valve 73. After the refrigerant is decompressed in the auxiliary expansion valve 73, the refrigerant flows into the refrigerant flow passage 64B of the refrigerant-heat medium heat exchanger 64 to evaporate. A heat absorbing operation is exerted at this time. A circulation is repeated in which the refrigerant evaporated in the refrigerant flow passage 64B flows through the refrigerant pipe 74, the refrigerant pipe 13C, and the accumulator 12 successively, and is sucked into the compressor 2 (this is indicated by the solid line arrows in FIG. 35).

On the other hand, the heat medium discharged from the circulating pump 62 flows into the heat medium pipe 68 through the heat medium heating heater 66 to reach the heat medium flow passage 64A of the refrigerant-heat medium heat exchanger 64, where heat is absorbed by the refrigerant evaporated in the refrigerant flow passage 64B, whereby the heat medium is cooled. A circulation is repeated in which the heat medium cooled by the heat absorbing operation of the refrigerant flows out from the refrigerant-heat medium heat exchanger 64 to reach the battery 55, and cools the battery 55 and is then sucked into the circulating pump 62. The controller 32 controls the operation of the compressor 2 and the circulating pump 62 on the basis of, for example, the battery temperature Tb detected by the battery temperature sensor 76 and the target battery temperature TBO.

Incidentally, when the battery temperature Tb becomes lower than the aforementioned appropriate temperature range under a low-temperature environment, the battery 55 is reduced in charging/discharging performance, but in the embodiment, the heat medium heating heater 66 is provided in the battery temperature adjustment device 61. Hence, when the battery temperature Tb is lowered than the above appropriate temperature range, the controller 32 allows the heat medium heating heater 66 to generate heat to heat the heat medium circulated through the battery 55. Consequently, the battery temperature Tb is raised to be maintained at the appropriate temperature range. However, it is to be noted that in that case, the controller 32 fully closes the auxiliary expansion valve 73 to prevent the refrigerant from being circulated in the refrigerant-heat medium heat exchanger 64.

Further, the constitutions of the refrigerant circuit R and the battery temperature adjustment device 61 described in each embodiment mentioned above are not limited thereto, and are needless to say changeable within the scope not departing from the gist of the present invention.

DESCRIPTION OF REFERENCE NUMERALS 1 air conditioner for vehicle
2 compressor
3 air flow passage
4 radiator
6 outdoor expansion valve
7 outdoor heat exchanger
8 indoor expansion valve (valve device)
9 heat absorber
13D refrigerant pipe (first bypass circuit)
13F refrigerant pipe (second bypass circuit)
15 outdoor blower
17 solenoid valve (opening/closing valve, valve device)
18 check valve
20 solenoid valve (opening/closing valve)
21 solenoid valve (first opening/closing valve)
22 solenoid valve (second opening/closing valve)
23 shutter
27 indoor blower
28 air mix damper
32 controller (control device)
55 battery
61 battery temperature adjustment device
62 circulating pump
64 refrigerant-heat medium heat exchanger
66 heat medium heating heater (heating device)
72 branch pipe (branch circuit)
73 auxiliary expansion valve
R refrigerant circuit.

The invention claimed is:
1. An air conditioner for a vehicle, which conditions air of a vehicle interior, comprising:
    a compressor to compress a refrigerant;
    an air flow passage through which the air to be supplied to the vehicle interior can flow;
    a radiator for letting the refrigerant radiate heat, thereby heating the air to be supplied from the air flow passage to the vehicle interior;
    an outdoor heat exchanger disposed outside the vehicle interior for letting the refrigerant absorb or radiate heat;

a battery temperature adjustment device for letting a heat medium circulate through a battery mounted in the vehicle, thereby adjusting a temperature of the battery; and a control device, wherein the battery temperature adjustment device has a refrigerant-heat medium heat exchanger for performing exchange of heat between the refrigerant and the heat medium, and wherein the control device is configured to execute:

a radiator and outdoor heat exchanger heating/battery cooling mode to let the refrigerant discharged from the compressor radiate heat in the radiator and the outdoor heat exchanger, decompress the refrigerant from which the heat has been radiated, and then let the refrigerant absorb heat in the refrigerant-heat medium heat exchanger, and an obstruct inflow heating/battery cooling mode to obstruct inflow of the refrigerant into the outdoor heat exchanger, let the refrigerant discharged from the compressor radiate heat in the radiator, decompress the refrigerant from which the heat has been radiated, and then let the refrigerant absorb heat only in the refrigerant-heat medium heat exchanger.

2. The air conditioner for the vehicle according to claim 1, wherein the control device is configured to execute a heat absorption heating/battery cooling mode to let the refrigerant discharged from the compressor radiate heat in the radiator, decompress the refrigerant from which the heat has been radiated, and then let the refrigerant absorb heat in the outdoor heat exchanger and the refrigerant-heat medium heat exchanger.

3. The air conditioner for the vehicle according to claim 2, further comprising:

an outdoor expansion valve for decompressing the refrigerant flowing out from the radiator and flowing into the outdoor heat exchanger, a heat absorber for letting the refrigerant flowing out from the outdoor heat exchanger absorb heat, thereby cooling the air to be supplied from the air flow passage to the vehicle interior, a valve device for controlling inflow of the refrigerant into the heat absorber, a first bypass circuit for letting the refrigerant flowing out from the outdoor heat exchanger to be sucked into the compressor without flowing into the valve device, a first opening/closing valve disposed in the first bypass circuit, a second bypass circuit for distributing the refrigerant flowing out from the radiator from a refrigerant upstream side of the outdoor expansion valve to let the refrigerant to flow to a refrigerant upstream side of the valve device, a second opening/closing valve disposed in the second bypass circuit, a branch circuit for letting the refrigerant flowing out from the second bypass circuit to flow into the refrigerant-heat medium heat exchanger, an auxiliary expansion valve disposed in the branch circuit to decompress the refrigerant flowing into the refrigerant-heat medium heat exchanger, and a check valve for obstructing inflow of the refrigerant flowing out from the second bypass circuit into the outdoor heat exchanger, wherein the control device is further configured to control the outdoor expansion valve, the valve device, the first opening/closing valve, the second opening/closing valve, the auxiliary expansion valve, and the battery temperature adjustment device to thereby change and execute the heat absorption heating/battery cooling mode, the radiator and outdoor heat exchanger heating/battery cooling mode, and the obstruction inflow heating/battery cooling mode.

4. The air conditioner for the vehicle according to claim 2, wherein the control device is configured to change and execute the respective heating/battery cooling modes on the basis of a required heating capability required for the radiator and a required battery cooling capability required for the battery temperature adjustment device.

5. The air conditioner for the vehicle according to claim 4, wherein the control device is configured to execute the heat absorption heating/battery cooling mode when the required heating capability is larger than the required battery cooling capability, to execute the obstruction inflow heating/battery cooling mode when the required heating capability and the required battery cooling capability are equal to each other or values close to each other, and to execute the radiator and outdoor heat exchanger heating/battery cooling mode when the required battery cooling capability is larger than the required heating capability.

6. The air conditioner for the vehicle according to claim 5, wherein the battery temperature adjustment device includes a heating device for heating the heat medium, and wherein the control device is configured to, in the heat absorption heating/battery cooling mode, enable the heating device to heat the heat medium when it is not possible to achieve the required heating capability by a heating capability generable by the radiator.

7. The air conditioner for the vehicle according to claim 5, wherein the control device is configured to, in the radiator and outdoor heat exchanger heating/battery cooling mode, control the operation of the compressor to thereby adjust the cooling capability of the battery by the battery temperature adjustment device, and to control circulation of the refrigerant in the radiator and/or the outdoor heat exchanger or passing of the refrigerant through the radiator and/or the outdoor heat exchanger to thereby adjust the heating capability of the vehicle interior by the radiator.

8. The air conditioner for the vehicle according to claim 7, wherein the control device is further configured to control the circulation of the refrigerant in the radiator via an outdoor expansion valve to decompress the refrigerant flowing into the outdoor heat exchanger, wherein the control device is further configured to control the circulation of the refrigerant via an auxiliary expansion valve to decompress the refrigerant flowing into the refrigerant-heat medium heat exchanger, wherein the control device is further configured to control the passing of the refrigerant through the radiator via an air mix damper to adjust a ratio at which the air in the air flow passage is to be passed through the radiator, and wherein the control device is further configured to control the passing of the refrigerant through the outdoor heat exchanger via an outdoor blower to pass outdoor air through the outdoor heat exchanger and/or via a shutter to obstruct inflow of running air into the outdoor heat exchanger.

9. The air conditioner for the vehicle according to claim 1, wherein the control device is further configured to execute, in a state in which the outdoor air is not passed through the outdoor heat exchanger or in a state in which the inflow of the running air into the outdoor heat exchanger is obstructed, a defrosting/heating/battery cooling mode to let the refrigerant discharged from the compressor radiate heat in the radiator and the outdoor heat exchanger, decompress the refrigerant from which the heat has been radiated, and then to let the refrigerant absorb heat in the refrigerant-heat medium heat exchanger.

\* \* \* \* \*